United States Patent
Iwata et al.

(10) Patent No.: US 9,957,457 B2
(45) Date of Patent: May 1, 2018

(54) SLIDING MEMBER

(71) Applicant: Daido Metal Company Ltd., Nagoya (JP)

(72) Inventors: Hideki Iwata, Inuyama (JP); Yasushi Saito, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 196 days.

(21) Appl. No.: 15/151,673

(22) Filed: May 11, 2016

(65) Prior Publication Data

US 2016/0333932 A1    Nov. 17, 2016

(30) Foreign Application Priority Data

May 14, 2015  (JP) .................. 2015-099124
May 14, 2015  (JP) .................. 2015-099125
Jun. 30, 2015  (JP) .................. 2015-132102

(51) Int. Cl.
*B22F 3/10*      (2006.01)
*C10M 103/04*    (2006.01)
(Continued)

(52) U.S. Cl.
CPC ............. *C10M 103/04* (2013.01); *B22F 3/11* (2013.01); *B22F 3/24* (2013.01); *B32B 3/10* (2013.01); *B32B 3/18* (2013.01); *B32B 5/145* (2013.01); *B32B 5/16* (2013.01); *B32B 5/30* (2013.01); *B32B 15/043* (2013.01); *B32B 15/08* (2013.01); *B32B 15/16* (2013.01); *B32B 15/18* (2013.01); *B32B 27/281* (2013.01);
(Continued)

(58) Field of Classification Search
None
See application file for complete search history.

(56) References Cited

U.S. PATENT DOCUMENTS 6,500,384 B1 * 12/2002 Yamauchi ............. B22F 3/24
                                                              419/26
9,360,048 B2 *  6/2016 Iwata ................ F16C 33/128
(Continued)

FOREIGN PATENT DOCUMENTS

JP    S56123337    *  9/1981  ............. C22C 1/10
JP    2001-355634      12/2001
(Continued)

*Primary Examiner* — Seth Dumbris
(74) *Attorney, Agent, or Firm* — Snyder, Clark, Lesch & Chung, LLP

(57) ABSTRACT

Provided is a sliding member comprising: a steel back metal layer; and a sliding layer including a porous sintered layer and a resin composition. The porous sintered layer includes Fe or Fe alloy granules and a Ni—P alloy part functioning as a binder for binding the Fe or Fe alloy granules with one another and/or for binding the Fe or Fe alloy granules with the steel back metal layer. The steel back metal layer is made of a carbon steel including 0.05 to 0.3 mass % of carbon, and includes: a non-austenite-containing portion having a structure of a ferrite phase and perlite formed in a central portion in a thickness direction of the steel back metal layer; and an austenite-containing portion having a structure of a ferrite phase, perlite and an austenite phase formed in a surface portion of the steel back metal layer facing the sliding layer.

15 Claims, 5 Drawing Sheets

(51) Int. Cl.

| | | |
|---|---|---|
| *C22C 19/05* | (2006.01) | |
| *C22C 38/00* | (2006.01) | |
| *B22F 3/11* | (2006.01) | |
| *B22F 3/24* | (2006.01) | |
| *C21D 9/40* | (2006.01) | |
| *C21D 1/18* | (2006.01) | |
| *B32B 5/16* | (2006.01) | |
| *B32B 15/04* | (2006.01) | |
| *B32B 15/08* | (2006.01) | |
| *B32B 15/16* | (2006.01) | |
| *B32B 15/18* | (2006.01) | |
| *B32B 3/10* | (2006.01) | |
| *B32B 3/18* | (2006.01) | |
| *F16C 33/20* | (2006.01) | |
| *B32B 5/14* | (2006.01) | |
| *B32B 5/30* | (2006.01) | |
| *B32B 27/28* | (2006.01) | |
| *B32B 27/32* | (2006.01) | |
| *B32B 27/34* | (2006.01) | |
| *B32B 27/38* | (2006.01) | |

(52) U.S. Cl.
CPC .......... *B32B 27/285* (2013.01); *B32B 27/286* (2013.01); *B32B 27/288* (2013.01); *B32B 27/32* (2013.01); *B32B 27/34* (2013.01); *B32B 27/38* (2013.01); *C21D 1/18* (2013.01); *C21D 9/40* (2013.01); *C22C 19/058* (2013.01); *C22C 38/00* (2013.01); *F16C 33/206* (2013.01); *F16C 33/208* (2013.01); *B32B 2250/02* (2013.01); *B32B 2250/04* (2013.01); *B32B 2260/025* (2013.01); *B32B 2260/046* (2013.01); *B32B 2262/103* (2013.01); *B32B 2262/105* (2013.01); *B32B 2264/10* (2013.01); *B32B 2264/105* (2013.01); *B32B 2264/107* (2013.01); *B32B 2307/50* (2013.01); *B32B 2307/554* (2013.01); *B32B 2307/714* (2013.01); *B32B 2307/732* (2013.01); *B32B 2307/746* (2013.01); *C10M 2201/053* (2013.01); *C21D 2211/001* (2013.01); *C21D 2211/005* (2013.01); *C21D 2211/009* (2013.01); *C22C 2200/00* (2013.01); *F16C 2202/10* (2013.01); *F16C 2204/52* (2013.01); *F16C 2204/60* (2013.01); *F16C 2204/62* (2013.01); *F16C 2208/00* (2013.01); *F16C 2240/48* (2013.01); *F16C 2240/60* (2013.01); *Y10T 428/12042* (2015.01); *Y10T 428/12063* (2015.01)

(56) References Cited

U.S. PATENT DOCUMENTS

| | | | |
|---|---|---|---|
| 9,677,021 B2* | 6/2017 | Iwata | B32B 15/043 |
| 2006/0169374 A1* | 8/2006 | Welschof | B32B 15/011 |
| | | | 148/566 |
| 2015/0267747 A1* | 9/2015 | Iwata | F16C 33/128 |
| | | | 428/613 |

FOREIGN PATENT DOCUMENTS

| | | |
|---|---|---|
| JP | 2002-061653 | 2/2002 |
| JP | 2002-180162 | 6/2002 |
| JP | 2013-083304 | 5/2013 |
| JP | 2013-217493 | 10/2013 |
| JP | 2013-237898 | 11/2013 |

* cited by examiner

SLIDING MEMBER

CROSS-REFERENCE TO RELATED APPLICATIONS

This application is based on and claims the benefit of priority from Japanese Patent Application No. 2015-099124 filed on May 14, 2015, Japanese Patent Application No. 2015-099125 filed on May 14, 2015, and Japanese Patent Application No. 2015-132102 filed on Jun. 30, 2015. The entire disclosures of all of the above applications are incorporated herein by reference.

BACKGROUND OF THE INVENTION (1) Field of the Invention

The present invention relates to a sliding member including a steel back metal and a sliding layer.

(2) Description of Related Art

Sintered copper based materials having a porosity of approximately 5 to 25% have been conventionally used for a sliding member of a fuel injection pump. A liquid fuel is supplied from an outer surface side of a cylindrical sliding member to an inner surface (sliding surface) side through pores in the sliding member, so that a lubricating fluid film of the liquid fuel is formed on the inner surface (sliding surface) to support a high-speed rotating shaft. Such sintered copper based materials have a problem that a copper alloy is subjected to corrosion due to organic acids or sulfur included in the fuel, and then the copper based corrosion products contaminate the fuel. For the reason, sintered copper based sliding materials including Ni, Al and Zn have been proposed to improve the corrosion resistance (see e.g. JP-A-2002-180162, JP-A-2013-217493 or JP-A-2013-237898).

On the other hand, sliding members made of multi-layered sliding materials have been conventionally used. The multi-layered sliding materials include a porous sintered layer of a copper alloy provided on a surface of a steel back metal through a copper-plated layer. Pores and a surface of the sintered layer are impregnated and covered with a resin composition (see e.g. JP-A-2002-61653 or JP-A-2001-355634). It has been proposed to apply such multi-layered sliding materials to a sliding member of a fuel injection pump (see e.g. JP-A-2013-83304).

BRIEF SUMMARY OF THE INVENTION

Although the sintered copper based sliding members of JP-A-2002-180162, JP-A-2013-217493 and JP-A-2013-237898 have corrosion resistance by including Ni, Al and Zn, the corrosion of the copper alloy due to organic acids or sulfur included in the fuel can not be completely prevented. Moreover, the sintered copper based sliding materials of the documents have a low strength since they include pores throughout the sliding member and thus have an insufficient loading capability especially for a sliding member used for a common rail-type fuel injection pump or the like as shown in JP-A-2013-83304.

The multi-layered sliding materials of JP-A-2002-61653, JP-A-2001-355634 or JP-A-2013-83304 have a high strength since they include a steel back metal. However, the porous sintered layer composed of a copper alloy is subjected to the corrosion of the copper alloy by organic acids or sulfur included in the fuel or lubricating oil. It has been also found that the sliding materials in the documents have a lower bonding strength at an interface between the sliding layer and the steel back metal, since the sliding materials are produced by simply spreading and then sintering an Fe or Fe alloy powder on a surface of a steel back metal to form a porous sintered layer and then impregnating the porous sintered layer with a resin composition without providing a copper-plated layer on the surface of the steel back metal.

The present invention has been made in view of the circumstances, and has an objective to provide a sliding member having high corrosion resistance as well as high bonding strength between a sliding layer and a steel back metal.

In an aspect of the present invention, the sliding member comprises a back metal layer and a sliding layer on the back metal layer and the sliding layer includes a porous sintered layer and a resin composition on the back metal layer. The porous sintered layer includes a Ni—P alloy part and a Fe or Fe alloy granules (or granular Fe or Fe alloy), and the Ni—P alloy part functions as a binder for binding the Fe or Fe alloy granules with one another and/or for binding the Fe or Fe alloy with the steel back metal layer. The steel back metal layer is made of a carbon steel including 0.05 to 0.3 mass % carbon. In a central portion of the steel back metal in the thickness direction, a non-austenite-containing part having a structure of a ferrite phase and perlite is formed. In a surface portion of the steel back metal layer facing the sliding layer, an austenite-containing portion having a structure of a ferrite phase, perlite, and an austenite phase is formed.

According to the present invention, the porous sintered layer in the sliding layer includes the Ni—P alloy part and the Fe or Fe alloy granules, and thus has high corrosion resistance against organic acids or sulfur. Furthermore, when the sliding member is elastically deformed by an external force applied thereon during an operation of a bearing unit, shearing at an interface between the sliding layer and the austenite-containing portion of the steel back metal layer hardly occurs, thereby a bonding strength between the sliding layer and the steel back metal layer can be enhanced.

In an embodiment of the present invention, Ni atoms of the Ni—P alloy part are diffused in the austenite-containing portion.

In an embodiment of the present invention, the austenite-containing portion has an average thickness of 1 to 30 μm.

In an embodiment of the present invention, a ratio of the austenite phase in a structure of the austenite-containing portion is 0.05 to 3 volume %.

In an embodiment of the present invention, an austenite phase of the austenite-containing portion has an average grain size of 0.5 to 5 μm.

In an embodiment of the present invention, a ratio of perlite in the austenite-containing portion is at least 25% less than a ratio of perlite in the non-austenite-containing part.

In an embodiment of the present invention, the Ni—P alloy part has a composition including 9 to 13 mass % of P and the balance of Ni and inevitable impurities.

In an embodiment of the present invention, the composition of the Ni—P alloy part includes:
  9 to 13 mass % of P;
  optionally one or more selected from 1 to 4 mass % of B, 1 to 12 mass % of Si, 1 to 12 mass % of Cr, 1 to 3 mass % of Fe, 0.5 to 5 mass % of Sn and 0.5 to 5 mass % of Cu; and
  the balance of Ni and inevitable impurities.

In an embodiment of the present invention, a ratio of the Ni—P alloy part in the porous sintered layer is 5 to 40 parts by mass in relation to 100 parts by mass of the porous sintered layer.

In an embodiment of the present invention, the Fe or Fe alloy granules is made of a carbon steel including 0.3 to 1.3 mass % of carbon. The Fe or Fe alloy granules have a structure of:
a ferrite phase, perlite, and an austenite phase; or
a ferrite phase, a mixture of perlite and cementite, and an austenite phase.

In a surface portion of the Fe or Fe alloy granules, a high austenite phase portion is formed. The high austenite phase portion has a ratio of the austenite phase at least 20% higher than a ratio of the austenite phase in a central portion of the Fe or Fe alloy granules.

According to the embodiment, a sliding member having a porous sintered layer in the sliding layer has a high strength. When the sliding member is elastically deformed by an external force applied thereon during an operation of a bearing unit, shearing at an interface between the Ni—P alloy part of the porous sintered layer and a surface of the Fe or Fe alloy granules hardly occurs, so that the strength of the porous sintered layer can be enhanced.

In an embodiment, the Fe or Fe alloy granules have an average grain size of 45 to 180 μm.

In an embodiment, Ni atoms of the Ni—P alloy part is diffused in a surface of the Fe or Fe alloy granules.

In an embodiment, the high austenite phase portion has a thickness of 1 to 30 μm.

In an embodiment, a ratio of the austenite phase in the high austenite phase portion is 0.05 to 3 volume %.

In an embodiment, an austenite phase in the high austenite phase portion has an average grain size of 0.5 to 5 μm.

In an embodiment, a ratio of the ferrite phase in the high austenite phase portion is at least 25% higher than a ratio of the ferrite phase in a central portion of the Fe or Fe alloy granules.

Other objects, features and advantages of the invention will become apparent from the following description of non-limiting embodiments of the invention in reference with the accompanying drawings.

DETAILED DESCRIPTION OF THE INVENTION

Embodiment 1

Figure 1:
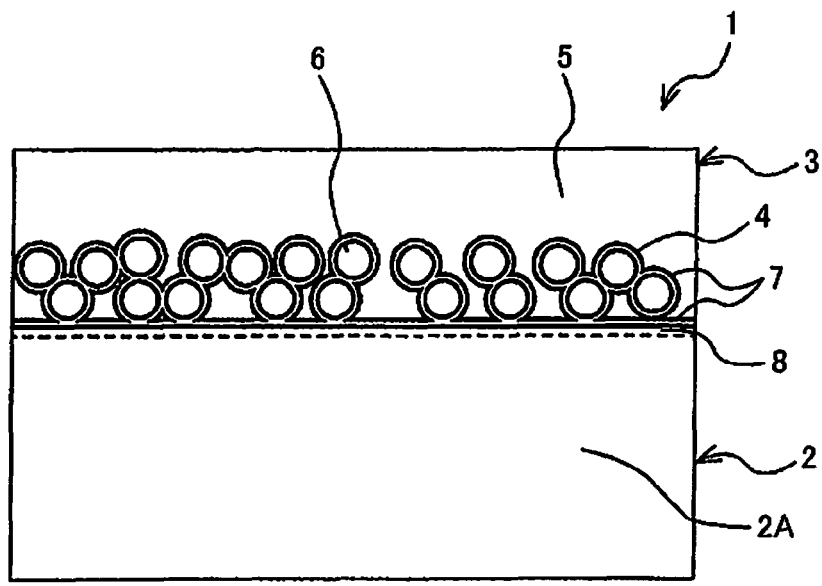
FIG. 1 is a schematic view showing a cross-section of a sliding member having an austenite-containing portion in a surface portion of a steel back metal layer according to an embodiment of the present invention.
Figure 2:
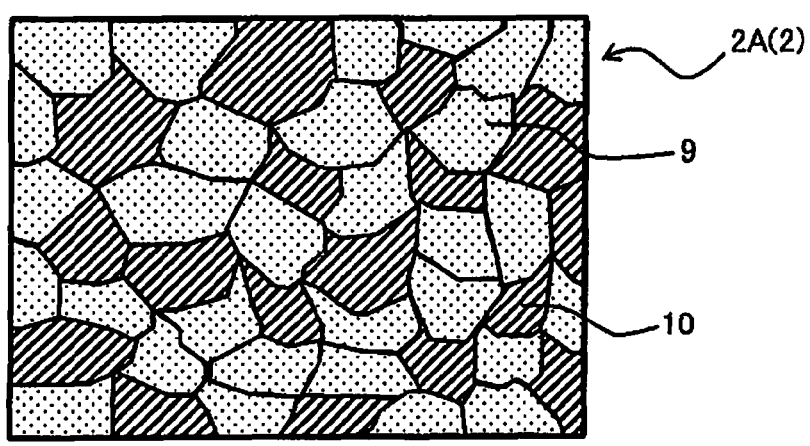
FIG. 2 is an enlarged view showing a structure of a non-austenite-containing part in a vicinity of a center in a thickness direction of the steel back metal layer in FIG. 1.
Figure 3:
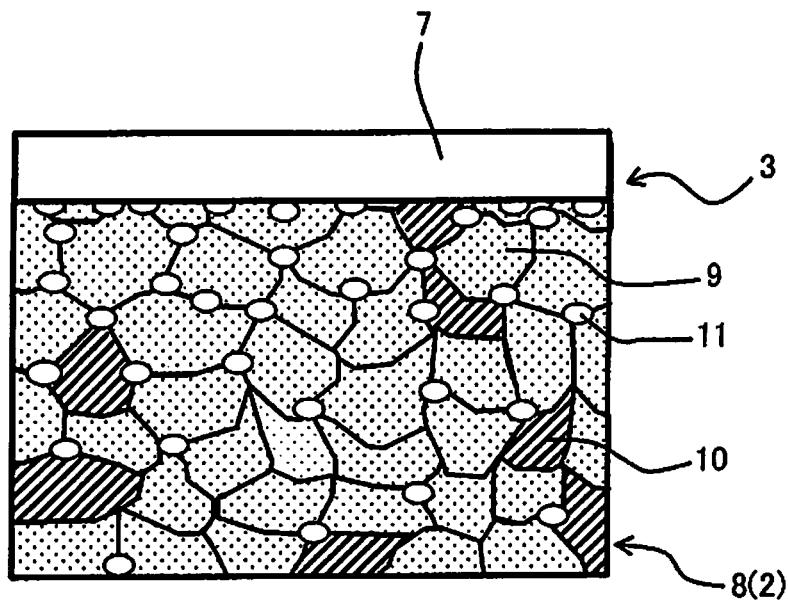
FIG. 3 is an enlarged view showing a structure of an austenite-containing portion in a vicinity of a surface of the steel back metal layer in FIG. 1.

With reference to FIGS. 1 to 3, a sliding member 1 having an austenite-containing portion 8 at a surface of a steel back metal layer 2 according to the present embodiment is described below.

FIG. 1 is a schematic view showing a cross-section of a sliding member 1 having an austenite-containing portion 8 at a surface of a steel back metal layer 2 according to an embodiment of the present invention. FIG. 2 is an enlarged view showing a structure of a non-austenite-containing part 2A in a vicinity of the center in a thickness direction of the steel back metal layer 2. FIG. 3 is an enlarged view showing a structure of the austenite-containing portion 8 in a vicinity of the surface of the steel back metal layer 2. An austenite phase 11 included in the austenite-containing portion 8 is illustrated in an exaggerated manner for easy comprehension.

As shown in FIG. 1, the sliding member 1 includes a steel back metal layer 2 and a sliding layer 3, and the sliding layer 3 includes a porous sintered layer 4 and a resin composition 5 on the steel back metal layer 2. The porous sintered layer 4 includes a Fe or Fe alloy granules 6 and a Ni—P alloy part 7. The Ni—P alloy part 7 functions as a binder that binds the granules of the Fe or Fe alloy 6 with one another and/or binds the Fe or Fe alloy granules 6 with the surface of the steel back metal layer 2. As shown in FIG. 1, the Fe or Fe alloy 6 granules are bonded with one another and/or the Fe or Fe alloy granules 6 are bonded with the surface of the steel back metal layer 2 through the Ni—P alloy part 7. The Fe or Fe alloy granules 6 may be directly contacted or sintered with one another, or the Fe or Fe alloy granules 6 may be directly contacted or sintered with the surface of the steel back metal layer 2. The surface of the Fe or Fe alloy granules 6 may have a portion partially uncovered with the Ni—P alloy part 7. The porous sintered layer 4 includes pores to be impregnated with a resin composition 5. The porosity thereof is 10% to 60%, more preferably 20% to 40%.

The steel back metal layer 2 is made of a carbon steel (hypoeutectoid steel) with a carbon content of 0.05 to 0.3 mass %. If the carbon steel includes less than 0.05 mass % carbon, a strength of the steel back metal layer 2 is low, resulting in insufficient strength of the sliding member 1. If the carbon steel includes more than 0.3 mass % carbon, a large amount of granular cementite (except laminated cementite that constitutes perlite 10) may be formed in a structure of the steel back metal layer 2, resulting in a brittle steel back metal layer 2.

The steel back metal layer 2 has a structure of a ferrite phase 9, perlite 10 and an austenite phase 11. The ferrite phase 9 has a body-centered cubic crystal structure, and includes a small amount of carbon up to 0.02 mass %, that is a composition close to a pure iron. On the other hand, the perlite 10 has a lamellar structure in which a ferrite phase and cementite ($Fe_3C$) as an iron carbide are alternately laminated in a thin sheet form. The perlite 10 includes a larger amount of carbon than a ferrite phase 9. An austenite phase 11 has a face-centered cubic crystal structure, with a carbon content of up to 2.14%.

A typical hypoeutectoid steel has a structure including a ferrite phase 9 and perlite 10 at a low temperature. The structure transforms into a single austenite phase 11 when heated to a temperature above an A3 transformation point (about 845° C. to 900° C. in a case of a hypoeutectoid steel with 0.05 to 0.3 mass % carbon). When the single austenite phase 11 in the hypoeutectoid steel is cooled to a temperature lower than the A3 transformation point, a part of the austenite phase 11 begins to transform into a ferrite phase 9 (A3 transformation), and thus a structure of the austenite phase 11 and the ferrite phase 9 is obtained until the temperature reaches an A1 transformation point (727° C.). When the temperature reaches the A1 transformation point (727° C.), the austenite phase 11 retained in the structure transforms into perlite 10 (eutectoid transformation). Consequently, a typical hypoeutectoid steel has a structure including the ferrite phase 9 and the perlite 10.

As shown in FIG. 2, a non-austenite-containing part 2A having a structure including a ferrite phase 9 and perlite 10 is formed in a central portion in a thickness direction of the steel back metal layer 2. (The thickness direction is perpendicular to a surface of the steel back metal layer 2 facing a sliding layer 3). The structure of the non-austenite-containing part 2A mainly includes a ferrite phase 9, and a ratio of perlite 10 in the structure is not more than 30 volume %. A structure of the steel back metal layer 2 has approximately the same structure as a vicinity of the center in the thickness direction, except the austenite-containing portion 8.

As shown in FIG. 3, an austenite-containing portion 8, which has a structure including a ferrite phase 9, perlite 10 and an austenite phase 11, is formed in the vicinity of a surface of the steel back metal layer 2 facing the sliding layer 3. All the austenite phases 11 in the steel back metal layer 2 are included in the au stenite-containing portion 8.

The steel back metal layer 2 may have a composition including carbon as stated above, and further including at least one of up to 0.1 mass % of Si, up to 1 mass % of Mn, up to 0.04 mass % of P, and up to 0.04 mass % of S, and the balance of Fe and inevitable impurities. The structure of the steel back metal layer 2 includes a ferrite phase 9, perlite 10 and an austenite phase 11, while it is permitted that it may include fine precipitates (that is precipitate that can not be detected by observation at 1000-fold magnification using a scanning electron microscope).

In the present embodiment, presence or absence of the austenite phase 11 and formation of the austenite-containing portion 8 in the structure can be confirmed using a combination of a field emission scanning electron microscope (FE-SEM) and a crystallographic orientation analyzer (EBSD). A structure is analyzed in a plurality of spots (e.g. 3 spots) in a range from the surface of the steel back metal layer 2 facing the sliding layer 3 to the vicinity of the center in the thickness direction in a cross-sectional structure in a direction parallel to the thickness direction of the sliding member 1, by moving the observation position in the thickness direction. Furthermore, a phase distribution image obtained by the phase analysis is measured by a typical image analysis method (e.g. analysis software: Image-Pro Plus (Version 4.5) by Planetron, Inc.) to determine an average thickness of the austenite-containing portion 8, an area ratio of the austenite phase 11 in the austenite-containing portion 8, and an average grain size of the austenite phase 11.

A thickness of the austenite-containing portion 8 is 1 to 50 μm from the surface of the steel back metal layer 2 facing the sliding layer 3. More preferably, the thickness of the austenite-containing portion 8 is 1 to 30 μm.

A surface of the austenite-containing portion 8 of the steel back metal layer 2 facing the sliding layer 3 includes Ni diffused from the Ni—P alloy part 7 of the porous sintered layer 4. Although an amount of Ni diffused from the Ni—P alloy part 7 into the austenite-containing portion 8 of the steel back metal layer 2 is very small, diffused Ni in the austenite-containing portion 8 is confirmed by electron probe microanalyzer (EPMA) measurement. It can be also confirmed that the concentration of Ni decreases gradually toward the inside from the surface of the austenite-containing portion 8 facing the sliding layer 3.

A ratio of the austenite phase 11 in the austenite-containing portion 8 may be 0.05% to 3 volume %, more preferably 0.15% to 3 volume %. As shown in FIG. 3, the austenite phase 11 in the austenite-containing portion 8 increases as approaching the surface of the steel back metal layer 2 facing the sliding layer 3 in the cross-sectional view in the thickness direction. Accordingly, it is presumed that an area ratio of the austenite phase 11 in the structure on the surface of the steel back metal layer 2 facing the sliding layer 3 is considerably larger than a volume ratio of the austenite phase 11 in the austenite-containing portion 8. The austenite phase 11 in the austenite-containing portion 8 may have an average grain size of 0.5 to 5 μm, more preferably 1 to 3 μm.

The ratio of the austenite phase 11 in the austenite-containing portion 8 and the average grain size of the austenite phase 11 may be determined by the method described above. The ratio of the austenite phase 11 in the austenite-containing portion 8 is measured as an area ratio in the cross-sectional view. The area ratio corresponds to the volume ratio of the austenite phase 11 in the austenite-containing portion 8.

As shown in FIGS. 2 and 3, a ratio of perlite 10 in the austenite-containing portion 8 is preferably at least 25% lower than a ratio of perlite 10 in the non-austenite-containing part 2A.

The ratio of perlite 10 in the austenite-containing portion 8 and the ratio of perlite 10 in the non-austenite-containing part 2A can be confirmed as follows. A cross-sectional structure in a direction in parallel to a thickness direction of the sliding member 1 is observed using a scanning electron microscope, and electron images of a plurality of spots (e.g. 3 spots) of the non-austenite-containing part 2A and the austenite-containing portion 8 are taken at 500-fold magnification, respectively. The images are analyzed by a typical image analysis method (e.g. analysis software: Image-Pro Plus (Version 4.5) by Planetron, Inc.), thereby the area ratio of perlite 10 in the structure can be measured. The area ratio of perlite 10 of the non-austenite-containing part 2A is observed in the vicinity of the center of the steel back metal layer 2 in the thickness direction. The observed area needs not to be strictly at the central position of the steel back metal layer 2 in the thickness direction. This is because a structure in a range from the central position until the austenite-containing portion 8 as well as in a range from the central position to a surface on an opposite side of the austenite-containing portion 8 of the steel back metal layer 3 are substantially same (that is, has the same area ratio of the perlite 10). In the present embodiment, the ratio of the perlite 10 in the steel back metal layer 2 is measured as the area ratio in the cross-sectional view. The area ratio corresponds to the volume ratio of the perlite 10 in the steel back metal layer 2.

A composition of the Ni—P alloy part 7 includes 9 to 13 mass % of P, and the balance of Ni and inevitable impurities.

The composition of the Ni—P alloy part 7 is in a composition range where the Ni—P alloy has a low melting point. More preferably, the composition of the Ni—P alloy part 7 includes 10 to 12 mass % of P, and the balance of Ni and inevitable impurities.

In a heating step for sintering the porous sintered layer 4 on the steel back metal layer 2 as described later, the steel back metal layer 2 is required to be heated at a high temperature for transforming the structure of the ferrite phase 9 and perlite 10 into the austenite phase 11. At a temperature where the structure of the steel back metal layer 2 sufficiently transforms into the austenite phase 11, all the constituents of the Ni—P alloy part 7 transform into a liquid phase, so that the Ni—P alloy part 7 functions as a binder that binds the Fe or Fe alloy granules 6 with one another and/or binds the Fe or Fe alloy granules 6 with the surface of the steel back metal layer 3. Consequently, a porous sintered layer 4 including the Fe or Fe alloy granules 6 and the Ni—P alloy part 7 is formed on the steel back metal layer 3. In a cooling step after the sintering, a cooling rate of the surface of the steel back metal layer 3 facing the porous sintered layer 4 is accelerated so as to form the austenite-containing part 8. If a composition of the Ni—P alloy part 7 includes less than 9 mass % or more than 13 mass % phosphor, the Ni—P alloy has a high melting point, and thus a high sintering temperature is necessary. In contrast, when the Ni—P alloy has a composition described above, the Ni—P alloy has a low melting point and thus an excessively high sintering temperature is not necessary. As a result, the cooling can be easily conducted at a cooling rate for forming the austenite-containing portion 8 on the surface of the steel back metal layer 2.

The Ni—P alloy part 7 may further include optionally at least one selected from 1 to 4 mass % of B, 1 to 12 mass % of Si, 1 to 12 mass % of Cr, 1 to 3 mass % of Fe, 0.5 to 5 mass % of Sn and 0.5 to 5 mass % of Cu, so that a strength of the Ni—P alloy part 7 is adjusted. When Ni—P alloy part 7 includes Cu as an optional element, the Cu content needs to be not more than 5 mass % in order to avoid to affecting corrosion resistance of the Ni—P alloy part 7. The Ni—P alloy part 7 including these optional elements preferably has a structure of a Ni matrix in which phosphor as essential element and optionally B, Si, Cr, Fe, Sn or Cu are dissolved in a solid solution form. Alternatively, the structure may be in a form of a Ni matrix including a secondary phase (precipitates and crystallized substances) of the components.

A ratio of the Ni—P alloy part 7 in the porous sintered layer 4 is 5 to 40 parts by mass, more preferably 10 to 20 parts by mass, in relation to 100 parts by mass of the porous sintered layer 4. The ratio of the Ni—P alloy part 7 is suitable for functioning as a binder for binding the Fe or Fe alloy granules 6 with one another and/or binding the Fe or Fe alloy 6 granules with a surface of the steel back metal layer 2 so as to form the porous sintered layer 4 on a surface of the steel back metal layer 2. When the ratio of the Ni—P alloy part 7 is less than 5 parts by mass, the porous sintered layer 4 has insufficient strength of and insufficient bonding between the porous sintered layer 4 and the steel back metal layer 2. When the ratio of the Ni—P alloy part 7 is more than 40 parts by mass, portion to form pores during sintering is filled with the Ni—P alloy, and thus the porous sintered layer 4 has an excessively small porosity.

The Fe or Fe alloy granules 6 in the porous sintered layer 4 may have an average grain size of 45 to 180 μm. A composition of the Fe alloy granules is not limited. Commercially available particles may be used, such as pure iron, hypoeutectoid steel, eutectoid steel, hypereutectoid steel, cast iron, high-speed steel, tool steel, austenite stainless steel, ferrite stainless steel, etc. Higher corrosion resistance against organic acids or sulfur in comparison with conventional copper alloys can be obtained, using any of the Fe alloys. The Fe or Fe alloy granules 6 constituting the porous sintered layer 4 may include a reaction phase on their surface (facing the Ni—P alloy part 7), that is produced by reaction with a component of the Ni—P alloy part 7.

The pore portion of the porous sintered layer 4 is impregnated by and the surface is covered with a resin composition 5. Examples of the resin composition 5 may include typical resin compositions used for sliding applications. Specifically, the resin composition may include one or more of fluororesin, polyether ether ketone, polyamide, polyimide, polyamide-imide, polybenzimidazole, epoxy, phenol, polyacetal, polyethylene, polypropylene, polyolefin, and polyphenylene sulfide. The resin may further include, as a solid lubricant, one or more of graphite, graphene, graphite fluoride, molybdenum disulfide, fluororesin, polyethylene, polyolefin, boron nitride, and tin disulfide. The resin composition 5 may further include, as a filler, one or more of granular or fibrous metal, metal compound, ceramic, inorganic compound, and organic compound. The resin, the solid lubricant and the filter that constitute the resin composition 5 are not limited to the examples given here.

Figure 10:
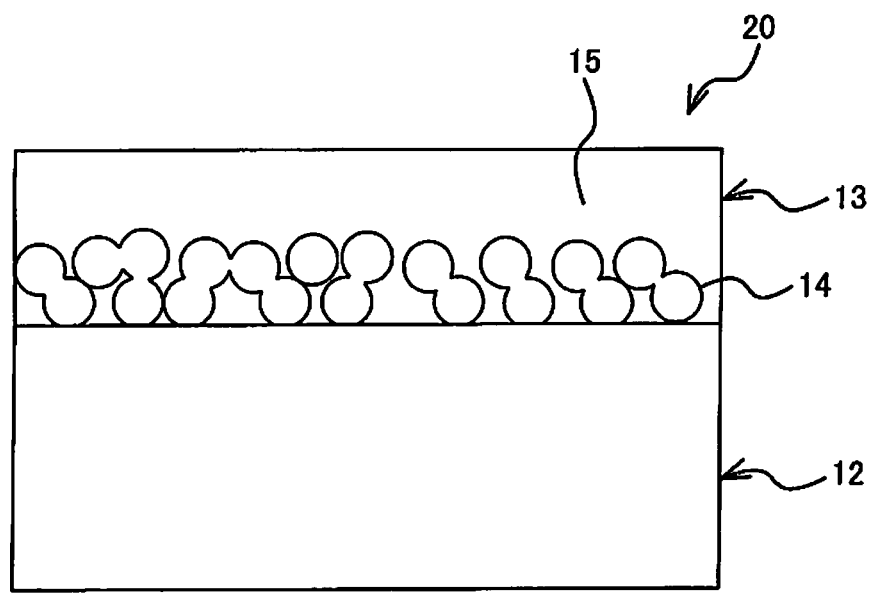
FIG. 10 is a schematic view showing a conventional sliding member.

With reference to FIG. 10 showing a conventional sliding member 20, described is a bonding between a sliding layer 13 and a steel back metal layer 12. FIG. 10 is a schematic view showing the sliding member 20 having the sliding layer 13 including a porous sintered layer 14 and a resin composition 15 on a conventional steel back metal layer 12.

As shown in FIG. 10, the structure of the conventional steel back metal layer 12 includes, in a whole thickness direction, a typical hypoeutectoid steel structure (equivalent to the structure shown in FIG. 2) mainly composed of a ferrite phase, with granular perlite dispersed in the ferrite phase matrix. The steel back metal layer 12 having such a structure results in a weak bonding between the surface of the steel back metal layer 12 and the porous sintered layer 14 of the sliding layer 13.

This is caused by a structural change (phase transformation) of the steel back metal layer 12 resulting from heating in the sintering step for forming the porous sintered layer 14 on the surface of the steel back metal layer 12 and cooling after the sintering. More particularly, a Fe alloy powder is scattered on a surface of the steel back metal layer 12, and the steel back metal layer 12 is heated at a temperature to cause sintering between the Fe alloy powders with one another, or between the Fe alloy powder and the steel back metal layer 12 (e.g. at 1000° C.). In the heating, the structure of the steel back metal layer 12 completely transform into an austenite phase. In the sintering step, the porous sintered layer 14 is bonded to the surface of steel back metal layer 12 having a structure of austenite phase. In the cooling step after the sintering, a temperature of the steel back metal layer 12 reaches an A3 transformation point (between 845° C. and 900° C. in a case of a hypoeutectoid steel with 0.05 to 0.3 mass % carbon) and a part of the austenite phase starts to transform into a ferrite phase. When the temperature reaches not higher than the A1 transformation point (727° C.), the austenite phase retained in the structure transforms into a perlite (eutectoid transformation) to make a structure of a ferrite phase and perlite. Since the ferrite phase or perlite has different crystal system from the austenite phase, the structural change (phase transformation) causes a volume change of the steel back metal layer 12. The volume change causes shearing at a surface of the porous sintered layer 14 which contacted with the austenite phase on a surface of the steel back metal layer 12, or causes a residual stress even if no shearing occurs. Accordingly, the conventional sliding member 20 has a weak bonding between the steel back metal layer 12 and the porous sintered layer 14 of the sliding layer 13.

In the sliding member 1 according to the present embodiment, the steel back metal layer 2 is made of a carbon steel with a carbon content of 0.05 to 0.3 mass %. In the central portion of the steel back metal layer 2 in the thickness direction, a non-austenite-containing part 2A having a structure of the ferrite phase 9 and perlite 10 (a typical hypoeutectoid steel structure including perlite 9 at a ratio of not higher than 30 volume %, while the ratio depending on the carbon content) is formed. In a surface of the steel back metal layer 2 facing the sliding layer 3, an austenite-containing portion 8 having a structure of a ferrite phase 9, perlite 10 and an austenite phase 11 is formed, thereby a bonding between the steel back metal layer 2 and the porous sintered layer 4 is improved. More particularly, the porous sintered layer 4 is bonded to the surface of the steel back metal layer 2 having a structure including the austenite phase 11 in a sintering step, and the austenite phase 11 remains as the austenite-containing portion 8 on the surface of the steel back metal layer 2 even subjected to cooling after the sintering. Consequently, the bond of the austenite phase 11 and the porous sintered layer 4 at the surface of the steel back metal layer 2 remains in a dispersed state. For this reason, the bonding between the steel back metal layer 2 and the porous sintered layer 4 of the sliding layer 3 is enhanced according to the present embodiment.

Next, a method for manufacturing the sliding member 1 according to the present embodiment is described below. First, a powder mixture including Fe or an Fe alloy powder and a Ni—P alloy powder is prepared. In the preparation of the powder mixture, component for the Ni—P alloy part 7 of the porous sintered layer 4 is needed to be included in a form of the Ni—P alloy powder. The prepared powder mixture is spread on a hypoeutectoid steel plate with 0.05 to 0.3 mass % carbon at a room temperature, and then sintered in a reducing atmosphere at 930° C. to 1000° C. in a sintering furnace, without pressurizing the spread powder layer.

During the sintering, the Ni—P alloy particles having a composition including 9 to 13 mass % of P and the balance of Ni start to melt when a temperature reaches 880° C. in the heating process. The liquid phase flows between particles of the Fe or Fe alloy or between the particles of the Fe or Fe alloy and a surface of the steel back metal layer 2, and thus the porous sintered layer 4 starts to be formed. The Ni—P alloy particles completely liquefy at 950° C. For reference, Ni—P alloy particles having a composition with a reduced content of P ranging from 10 to 12 mass % and the balance of Ni completely liquefy at 930° C.

The sintering temperature is set at or above a temperature at which the Ni—P alloy particles completely melt. As described later, a composition of the Ni—P alloy is selected so as to completely melt at or above a temperature (A3 transformation point) at which a structure of the steel back metal layer 2 completely transforms into an austenite phase 11.

When a temperature of the steel back metal layer 2 reaches 727° C. (A1 transformation point) in the heating step during sintering, a structure of the ferrite phase 9 and perlite 10 starts to transform into an austenite phase 11. The steel back metal layer 2 having 0.05 mass % to 0.3 mass % carbon completely transforms into a single austenite phase 11 at 900° C. Since the austenite phase 11 has a larger interstice (distance) between Fe atoms than that of the ferrite phase 9, Ni atoms of the Ni—P alloy part 7 in the porous sintered layer 4 easily enter the interstice and thus Ni easily diffuses therein. As described above, the composition of the Ni—P alloy is selected so as to completely melt at or above a temperature (A3 transformation point) at which the structure of the steel back metal layer 2 completely transforms into an austenite phase 11. The sintering temperature is set at or above the temperature at which the Ni—P alloy particles completely melt. This is because the Ni atoms in the Ni—P alloy part 7 in a liquid phase more easily diffuses into an austenite phase 11 at the surface of the steel back metal layer 2 than the Ni atoms in a solid phase. The Ni atoms in a liquid phase diffuses in an austenite phase 11 on the surface of the steel back metal layer 2, and solid-dissolved to make a solid phase at the same time. Consequently, many of the Ni atoms diffuse in a vicinity of the surface of the steel back metal layer 2. Due to the diffusion of the Ni atoms into the surface of the steel back metal layer 2 in the heating step during sintering, it is presumed that the austenite phase 11 in the vicinity of the surface of the steel back metal layer 2 is thermodynamically more stable than the internal austenite phase 11. The diffusion of Ni and the stabilization of the austenite phase 11 at the surface of the steel back metal layer 2 relate to formation of an austenite-containing portion 8 in a surface portion of the steel back metal layer 2 in the cooling step as described later, and to a ratio of perlite 10 in the austenite-containing portion 8.

In a cooling step after the sintering, it is necessary to make the cooling rate different between a surface having the porous sintered layer 4 (the side facing the porous sintered layer 4) and an opposite surface of the steel back metal layer 2 having no porous sintered layer 4, during a decreasing temperature range from 900° C. to 700° C. The surface of the steel back metal layer 2 on the side of the porous sintered layer 4 is rapidly cooled so as to prevent precipitation of a large amount of pro-eutectoid ferrite phase from the austenite phase 11 during temperature decrease to 727° C. (A1 transformation point) as well as eutectoid transformation of the austenite phase 11 into perlite 10 at 727° C. (A1 transformation point) and so as to form a structure of an austenite phase 11 and a ferrite phase 9 transformed from a part of the austenite phase 11 when the temperature reaches 700° C. As described above, Ni of the liquefied Ni—P alloy part 7 in the heating step diffuses into the austenite phase 11 on the surface of the steel back metal layer 2 on a side of the porous sintered layer 4. The austenite phase 11 including Ni is stabilized and the eutectoid transformation hardly occurs at 727° C. (A1 transformation point) in the cooling step. Consequently, the austenite phase 11 can be easily remained in the structure in the surface portion on the side of the porous sintered layer 4 of the steel back metal layer 2, even when the temperature reaches 700° C. On the other hand, the surface opposed to the porous sintered layer 4 of the steel back metal layer 2 is cooled at a rate such that the austenite phase 11 transforms completely into the ferrite phase 9 and perlite 10, when the temperature reaches 727° C. (A1 transformation point). An internal portion of the steel back metal layer 2 is cooled slower than the rate at the surface on the side of the porous sintered layer 4 of the steel back metal layer 2, so that the austenite phase 11 transforms completely into the ferrite phase 9 and perlite 10, when the temperature reaches 727° C. (A1 transformation point).

As specific cooling method, an injection flow (e.g. with a collision pressure of 1.1 MPa or more at the surface of the porous sintered layer 4) of a cooling gas (e.g. nitrogen gas) is directly sprayed only on the surface on the side of the porous sintered layer 4 of the steel back metal layer 2 in order to rapidly cool it. On the other hand, the injection flow of a cooling gas is not directly sprayed on the surface on the side opposite to the porous sintered layer 4 of the steel back metal layer 2, which may be mildly cooled through heat exchange with an atmosphere (cooling gas after sprayed to the surface on the side of the porous sintered layer 4) in the cooling apparatus. During a temperature range of the steel back metal layer 2 decreases from 700° C. to a room temperature, a cooling rate may be slow such that the austenite phase 11 in the structure at the surface of the steel back metal layer 2 on the side of the porous sintered layer 4 transforms into perlite 10. After cooling to a room temperature, the dispersed granular austenite phase 11 remains in the structure in the vicinity of the surface facing the porous sintered layer 4 of the steel back metal layer 2. As described above, it is presumed that the Ni atoms in the Ni—P alloy part 7 of the porous sintered layer 4 diffuses in the austenite phase 11 on the surface of the steel back metal layer 2 facing the porous sintered layer 4 in the sintering step, thereby the austenite phase 11 is thermodynamically stabilized to make the structure including retained austenite phase 11 even when cooled to a room temperature. The structure in the vicinity of the surface on the side opposite to the porous sintered layer 4 and the structure of the internal portion of the steel back metal layer 2 (or a ratio of perlite 10 in the structure and an average grain size of perlite 10) depend on the eutectoid transformation at 727° C. (A1 transformation point), not being affected by the cooling rate during temperature decrease from 700° C. to a room temperature.

Different from the present embodiment, if rapid cooling is applied during temperature decrease from 700° C. to a room temperature, a ratio of the austenite phase 11 retaining in the structure on the surface facing the porous sintered layer 4 of the steel back metal layer 2 can be increased. In this case, however, the structure mainly includes a martensite phase and a bainite phase, so that the steel back metal layer 2 is hard and brittle. Accordingly, the structure is not suitable as the steel back metal layer 2 of the sliding member 1 which needs to be processed into a cylindrical bearing.

The cooling rate and the cooling time for transforming the structure of the steel back metal layer 2 including a single austenite phase 11 in the heating step during sintering into the structure of the steel back metal layer 2 according to the present embodiment in the cooling step are determined with reference to the CCT diagram (continuous cooling transformation diagram) and the TTT diagram (isothermal transformation diagram) for a hypoeutectoid steel.

With the mechanism described above, the non-austenite-containing part 2A including a ferrite phase 9 and perlite 10 (a typical hypoeutectoid steel structure with a ratio of perlite 10 depending on the carbon content) is formed in the internal portion of the steel back metal layer 2. On the other hand, the austenite-containing portion 8 having the structure of a ferrite phase 9, perlite 10 and an austenite phase 11 is formed in the surface portion of the steel back metal layer 2 facing the sliding layer 3. The austenite-containing portion 8 may include a bainite, a sorbite, a troostite, a martensite phase or a cementite phase in a small amount (a ratio of not more than 3%).

When a ratio of the perlite 9 in the austenite-containing portion 8 is at least 25% less than a ratio of the perlite 10 in the non-austenite-containing part 2A, a bonding is further enhanced between the steel back metal layer 3 and the sliding layer 3.

In the sliding member 1 shown in FIG. 1, a whole surface of the austenite-containing portion 8 of the steel back metal layer 2 is covered with the Ni—P alloy part 7 of the porous sintered layer 4. However, different from the sliding member 1 shown in FIG. 1, the resin composition 5 of the sliding layer 3 may be bonded to the surface of the austenite-containing portion 8 of the steel back metal layer 2. In the case, if a ratio of perlite 10 may be greater in the surface of the austenite-containing portion 8 of the steel back metal layer 2, shearing may locally occur at an interface between the resin composition 5 of the sliding layer 1 and the steel back metal layer 2 when the sliding member 1 is used as a bearing. It is because a temperature rise of the sliding member 1 in use results in generation of a shearing stress at the interface between the resin composition 5 and the steel back metal layer 2, since the resin composition 5 has a larger thermal expansion than the steel back metal layer 2.

Specifically, a thermal expansion coefficient is different between the ferrite phase 9 or the austenite phase 11 and perlite 10 in the austenite-containing portion 8 of the steel back metal layer 2. Since perlite 10 includes cementite (Fe3C) as iron carbide, the thermal expansion coefficient is smaller than those of the ferrite phase 9 and the austenite phase 11. Accordingly, the large difference in the thermal expansion coefficient at the interface between the resin composition 5 and perlite 10 at the surface of the austenite-containing portion 8 causes a shearing stress, which may form a fine shearing portion.

In contrast, in the present embodiment, the austenite-containing portion 8 in the surface portion of the steel back metal layer 2 facing the sliding layer 3 has a ratio of perlite 10 at least 25% less than the ratio of the perlite 10 in the non-austenite-containing part 2A in the internal portion of the steel back metal layer 2, thereby the shearing between the sliding layer 3 and the steel back metal layer 2 hardly occurs.

The ratio of the perlite 10 in the austenite-containing portion 8 relates to a retention time from a complete melt of the Ni—P alloy in the sintering step to solidification of the Ni—P alloy in the cooling step. As the retention time is prolonged, a diffusion of Ni atoms in a vicinity of a surface of the steel back metal layer 2 and a diffusion of carbon atoms of the vicinity of the surface into an internal portion are accelerated, thereby the ratio of perlite 10 in the austenite-containing portion 8 tends to decrease. Note that the sliding member 1 of the present invention is not limited to the constitution described above, and the ratio of perlite 10 in the austenite-containing portion 8 may be larger than or equal to the ratio of perlite 10 in the non-austenite-containing part 2A.

As described above, after the porous sintered layer 4 is formed on the surface of the steel back metal layer 2, a previously prepared resin composition 5 (which may be diluted by an organic solvent) is impregnated so that the resin composition 5 fills pores in the porous sintered layer 4 and covers the surface of the porous sintered layer 4. Then, the member is heated for drying and baking the resin composition 5, and thus the sliding layer 3 including the porous sintered layer 4 and the resin composition 5 is produced on the surface of the steel back metal layer 2. The material described above may be used as the resin composition 5.

In the present embodiment, a mixed powder of Fe or Fe alloy powder and Ni—P alloy powder are used. If an Fe—Ni—P alloy powder manufactured by an atomizing process, etc., or a mixed powder of a Ni powder and an Fe—P alloy powder is used, only a part of Ni and phosphor in the powder composition liquefy during a sintering process, and thus a small amount of liquid phase is generated and diffusion of Ni atoms into a surface of the steel back metal layer hardly occurs. Thus, the austenite-containing portion including the austenite phase is not formed on the surface of the steel back metal layer. Since the liquid phase mainly includes $Ni_3P$, the $Ni_3P$ phase (intermetallic compound) is formed at an interface between the porous sintered layer and the steel back metal layer after sintering. The $Ni_3P$ phase is hard but brittle, resulting in very small bonding strength between the porous sintered layer and the steel back metal layer.

Embodiment 2

Next, an embodiment of the preferable constitution of the Fe or Fe alloy granules 6 in the porous sintered layer 4 is described with reference to FIGS. 4 and 5, though not limited thereto. Since the general constitution of the sliding member and the back metal layer is the same as described in Embodiment 1, the preferable constitution of the Fe or Fe alloy 6 is mainly described as follows.

The Fe or Fe alloy granules 6 in the porous sintered layer 4 may have an average grain size of 45 to 180 μm. By using the Fe or Fe alloy 6 having the average grain size, the porous sintered layer 4 is provided with pores suitable for impregnating with a resin composition 5. If an average grain size of the Fe or Fe alloy 6 is less than 45 μm, each pore in the porous sintered layer 4 is too small to be impregnated with the resin composition 5. If an average grain size of the Fe or Fe alloy 6 is more than 180 μm, a high austenite phase portion 18 is not formed in a part of a surface of the Fe or Fe alloy granules 6 in some cases.

The Fe or Fe alloy granules 6 are made of a carbon steel with a carbon content of 0.3 to 1.3 mass %, and commercially available granular hypoeutectoid steel, eutectoid steel or hypereutectoid steel produced by an atomizing process may be used. If a carbon steel having a carbon content of less than 0.3 mass % is used as the steel 6, the porous sintered layer 4 has a low strength, resulting in insufficient strength of the sliding member 1. If a carbon steel has a carbon content of more than 1.3 mass %, a ratio of granular cementite (cementite other than laminar cementite that constitutes perlite 10 in the structure of the steel 6) increases, resulting in a brittle porous sintered layer 4 in some cases. The carbon steel having a carbon content of 0.3 mass % to 1.3 mass % provides higher corrosion resistance against organic acids or sulfur than a conventional copper alloy. The granular steel or steel granules 6 including the above carbon content may further include: one or more of up to 1.3 mass % of Si, up to 1.3 mass % of Mn, up to 0.05 mass % of P and up to 0.05 mass % of S; and the balance of Fe and inevitable impurities. The steel granules 6 have a structure of: a ferrite phase 9, perlite 10 and an austenite phase 11. Alternatively, the structure may be of a ferrite phase 9, a mixture 10A of perlite and cementite, and an austenite phase 11. Note that the structure may include fine precipitates (precipitate phase that can not be detected by observation at 1000-fold magnification using a scanning electron microscope). The steel granules 6 may include a reaction phase produced by reaction with a component of the Ni—P alloy part 7, on its surface (surface facing the Ni—P alloy phase 7). Since the porous sintered layer 4 includes the steel granules 6 and the Ni—P alloy part 7, it has high corrosion resistance against organic acids or sulfur.

Figure 4:
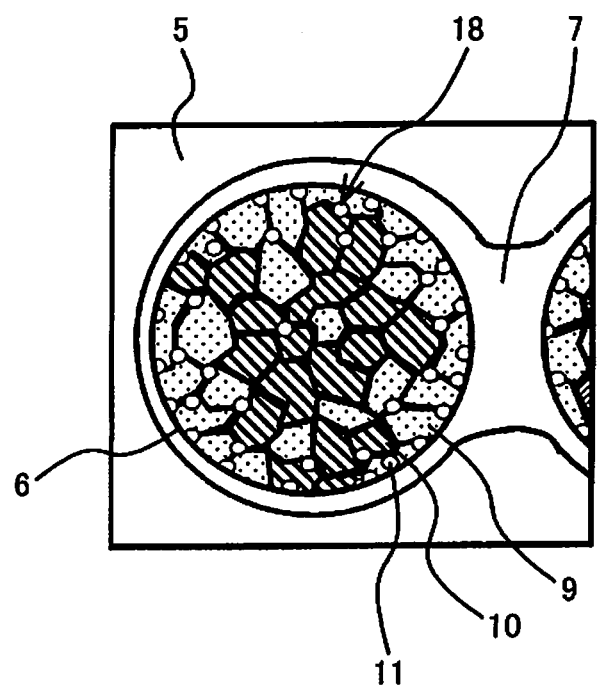
FIG. 4 is a schematic view showing a structure of steel granules according to a second embodiment of the present invention.

When a hypoeutectoid carbon steel having a carbon content of not less than 0.3 mass % and less than 0.8 mass % or an eutectoid steel having a carbon content of 0.8 mass % is used as the granular steel 6, the steel 6 has a structure of a ferrite phase 9, perlite 10 and an austenite phase 11 as shown in FIG. 4. At a surface of the steel granules 6 facing the Ni—P alloy part 7, a high austenite phase portion 18 is formed, which has an austenite phase 11 with a ratio at least 20% higher than a ratio of an austenite phase 11 in a central portion of the steel granule 6. The high austenite phase portion 18 forms an approximately annular layer adjacent to the surface of the steel granule 6 viewed in a cross section of the granule 6 as shown in FIG. 4. It is permitted that not more than 20% of the number of the steel granules 6 constituting the porous sintered layer 4 (namely, not more than 20 volume % of the total volume of the steel granules 6) is not provided with an austenite phase 11. The structure of the steel 6 may include a bainite phase, a sorbite phase, a troostite phase, a martensite phase, etc., in a small amount (a ratio of not more than 3%).

The steel granules 6 of the sliding member 1 of the present invention have a different structure from a typical carbon steel. A typical hypoeutectoid steel has a structure of a ferrite phase 9 and perlite 10 at a low temperature and transforms into a single austenite phase 11 when heated at a temperature higher than an A3 transformation point (which temperature depends on a carbon content, e.g. about 900° C. in a case of 0.3 mass % carbon). When the single austenite phase 11 is cooled lower than the A3 transformation point, a part of the austenite phase 11 starts to transform into a ferrite phase 9 (A3 transformation), and a structure of the austenite phase 11 and the ferrite phase 9 is obtained between the A3 transformation point and an A1 transformation point (727° C.). Furthermore, when the temperature reaches the A1 transformation point (727° C.), the retained austenite phase 11 transforms into perlite 10 (eutectoid transformation). The typical hypoeutectoid steel thus has a structure of the ferrite phase 9 and perlite 10. Also, a typical eutectoid steel (0.8 mass % carbon) has a single perlite 10 phase.

Presence or absence of the austenite phase 11 in the structure is confirmed by the phase analysis described in Embodiment 1. Furthermore, the phase distribution image obtained by the phase analysis can be analyzed by a typical image analysis method (e.g. analysis software: Image-Pro Plus (Version 4.5) by Planetron, Inc.) to determine the presence or absence of the high austenite phase portion 18 at a surface of the steel granules 6, and to measure an average thickness of the high austenite phase portion 18, an area ratio of the austenite phase 11 in the high austenite phase portion 18, and an average grain size of the austenite phase 11.

A thickness of the high austenite phase portion 18 is 1 to 30 μm from the interface with the resin composition 5 or the Ni—P alloy part 7 of the sliding layer 3. Furthermore, the thickness is preferably 1 to 10 μm. Furthermore, the thickness is preferably not more than 20% of an average grain size of the steel granules 6. As far as a thickness of the high austenite phase portion 18 is not more than 30 μm, the high austenite phase portion 18 does not affect a strength of the steel 6. However, if the thickness is less than 1 μm, there is a case where the high austenite phase portion 18 is not be formed at a part of the surface of the steel 6.

A surface of the high austenite phase portion 18 of the steel granules 6 facing the resin composition 5 or the Ni—P alloy part 7 includes Ni diffused from the Ni—P alloy part 7 in the porous sintered layer 4. Although an amount of Ni diffused from the Ni—P alloy part 7 into the high austenite phase portion 18 is very small, the diffused Ni is confirmed by electron probe microanalyzer (EPMA) measurement. It can be also confirmed that the Ni concentration decreases gradually toward the inside of the granule from the surface of the high austenite phase portion 18 facing the Ni—P alloy part 7.

A ratio of the austenite phase 11 in the high austenite phase portion 18 may be 0.05 to 3 volume %, more preferably 0.15 to 3 volume %. The austenite phase 11 increases as approaching the surface facing the Ni—P alloy part 7 from the central portion of the granule. Accordingly, it is presumed that an area ratio of the austenite phase 11 at the surface of the steel 6 facing the resin composition 5 or the Ni—P alloy part 7 is considerably larger than a volume ratio of the austenite phase 11 in the high austenite phase portion 18. The austenite phase 11 in the high austenite phase portion 18 may have an average grain size of 0.5 to 5 μm, preferably 1 to 3 μm.

A method for confirming the ratio and the average grain size of the austenite phase 11 in the high austenite phase portion 18 may be obtained by the method described above. The ratio of the austenite phase 11 in the high austenite phase portion 18 is measured as an area ratio in the cross-sectional view. The area ratio corresponds to a volume ratio of the austenite phase 11 in the high austenite phase portion 18.

Figure 5:
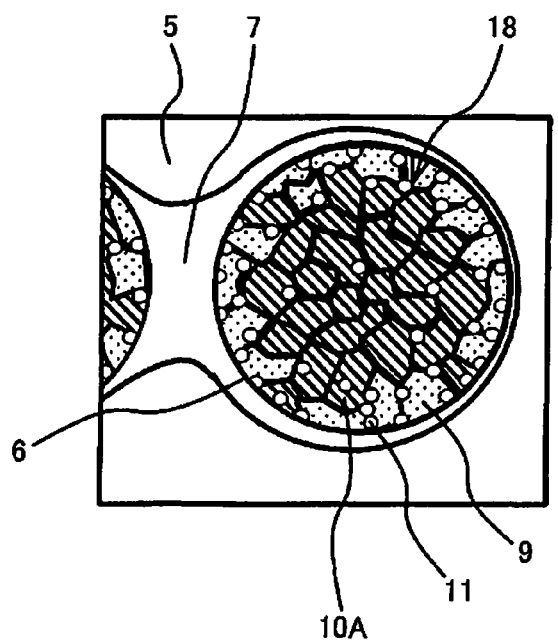
FIG. 5 is an enlarged view showing a structure of steel granules in another embodiment.
Figure 6:
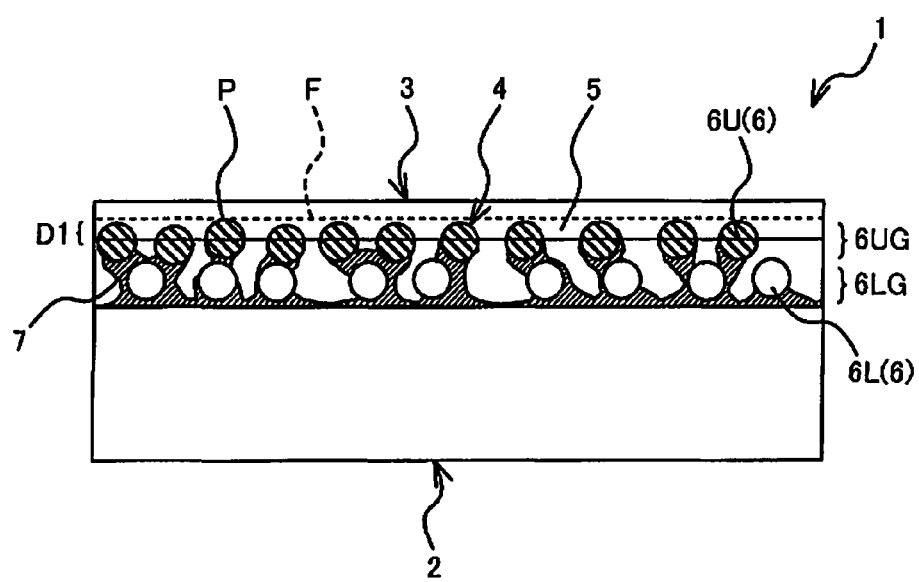
FIG. 6 is a schematic view showing a cross-section of a sliding member having a sliding layer on a surface of a back metal layer according to a third embodiment of the present invention.

FIG. 5 is an enlarged view of another embodiment of a structure of steel granules 6. When a hypereutectoid steel powder having a carbon content of more than 0.8 mass % and not more than 1.3 mass % is used as the steel 6, the steel granules 6 have a structure of a ferrite phase 9, a mixture 10A of perlite and cementite, and an austenite phase 11 as shown in FIG. 5. At a surface of the steel granules 6 facing the resin composition 5 or the Ni—P alloy part 7, a high austenite phase portion 18 is formed, which has a ratio of the austenite phase 11 at least 20% higher than a ratio of an austenite phase 11 in the central portion of the steel granules 6. The high austenite phase portion 18 forms an approximately annular layer adjacent to the surface of the steel granules 6 viewed in a cross-section of the steel granules 6 as shown in FIG. 5. It is permitted that not more than 20% of the number of the steel granules 6 constituting the porous sintered layer 4 (namely, not more than 20 volume % of the total volume of the steel granules 6) is not provided with the high austenite phase portion 18 in the structure. The structure of the steel 6 may include a bainite phase, a sorbite phase, a troostite phase, a martensite phase, etc., in a small amount (a ratio of not more than 3%).

As shown in FIGS. 4 and 5, preferably a ratio of a ferrite phase 9 in the high austenite phase portion 18 is at least 25% higher than a ratio of a ferrite phase 9 in the central portion of the steel granule 6.

The ratios of a ferrite phase 9 in the high austenite phase 18 and that in the central portion can be confirmed in the same manner as in Embodiment 1. Using a scanning electron microscope, electron images of a plurality of spots (e.g. 3 spots) in a vicinity of the central position of the steel granules 6 and in the high austenite phase portion 18 in a cross-section in a direction parallel to a thickness direction of the sliding member 1 are taken at 500-fold magnification respectively, and analyzed by a typical image analysis method (e.g. analysis software: Image-Pro Plus (Version 4.5) by Planetron, Inc.), thereby the area ratios of a ferrite phase 9 in the structure can be measured. In the present embodiment, the ratio of the ferrite phase 9 is measured as an area ratio in the cross-sectional view. The area ratio corresponds to a volume ratio of the ferrite phase 9 in the structure of the steel 6.

Regarding a composition of the Ni—P alloy, refer to Embodiment 1.

In a heating step for sintering the porous sintered layer 4 on the back metal layer 2, as described later, the entire components of the Ni—P alloy part 7 are liquefied, and thus Ni is diffused into a surface of the steel granules 6. The diffusion of Ni into the surface of the steel 6 relates to a formation of the high austenite phase portion 18 at the surface of the steel 6. If a phosphor content of the Ni—P alloy part 7 is less than 9 mass % or more than 13 mass %, a melting point of the Ni—P alloy increases, and a less amount of Ni—P alloy is liquefied. Thus, Ni is hardly diffused into the surface of the steel 6 during sintering, and the high austenite phase portion 18 is hardly formed.

Next, a conventional porous sintered layer 14 of the sliding layer 13 in a sliding member 20, which is sintered from a carbon steel powder, is described with reference to FIG. 10 again. FIG. 10 is a schematic view showing the conventional sliding member 20 provided with the porous sintered layer 14 produced by sintering a carbon steel (hypoeutectoid steel) powder having a structure of a ferrite phase and perlite, on a conventional back metal layer 12. In the structure of the porous sintered layer 14 after sintered, there is no difference in a ratio of a ferrite phase and perlite between a surface and an internal portion of the carbon steel. An austenite phase is not formed in the structure.

The conventional porous sintered layer 14 of FIG. 10 has a low strength due to a small bonding strength of the steel granules. This is caused by the structural change (phase transformation) of the steel resulting from a heating and cooling in the sintering step for sintering the porous sintered layer 14 on the surface of the back metal layer 12. More particularly, after spreading the steel granules (a carbon steel powder) on a surface of the back metal layer 12, the steel is heated at a temperature (e.g. 1000° C.) to cause sintering between the steel granules with one another, or between the steel and the back metal layer 12. At the time, a structure of the steel completely transforms into an austenite phase. In the sintering step, surfaces of the steel granules transformed into the austenite phase structure are bonded with one another to form the porous sintered layer 14. In the cooling step after the sintering, a temperature reaches an A3 transformation point (about 900° C., in a case of a hypoeutectoid steel with 0.3 mass % carbon), and then a part of the austenite phase starts to transform into a ferrite phase. At a temperature of an A1 transformation point (727° C.) or lower, the remaining austenite phase transforms into perlite (eutectoid transformation) so that a structure of a ferrite phase and perlite is produced. Since the crystalline system is different between an austenite and a ferrite (or perlite), the structural change (phase transformation) causes a volume change of the steel. The volume change causes shearing at a surface at which surfaces of the steel granules in the austenite phase were in contact one another, or causes a residual stress even if no shearing occurs. Accordingly, the conventional porous sintered layer 14 in the conventional sliding member 20 has a low strength.

When a hypereutectoid carbon steel is used for the porous sintered layer 14, the steel structure also transforms into a single austenite phase in the sintering step, resulting in the structure change (phase transformation) of the steel (carbon steel) in the cooling step after sintering. Consequently, a strength of the porous sintered layer 14 is reduced due to the same reason as the hypereutectoid steel powder.

In the sliding member 1 according to the present embodiment, the steel granules 6 are made of a carbon steel with 0.3 to 1.3 mass % carbon, and has a structure of a ferrite phase 9, perlite 10 and an austenite phase 11; or alternatively a structure of a ferrite phase 9, a mixture 10A of perlite and cementite and an austenite phase 11. The Ni—P alloy part 7 of the sliding member 1 functions as a binder that binds the steel granules 6 with one another and/or binds the steel granules 6 with a surface of the back metal layer 2. At the surface of the steel granules 6 facing the Ni—P alloy part 7, a high austenite phase portion 18 is formed, which has a ratio of the austenite phase 11 at least 20% higher than a ratio of the austenite phase 11 in the central portion of the steel granules 6. Consequently, a strength of the porous sintered layer 4 is enhanced. Specifically, the surface of the steel granules 6 having an austenite phase 11 is bonded to the Ni—P alloy part 7 in the sintering step. The Ni—P alloy part 7 causes no phase transformation (structure change) in cooling after the sintering, since the austenite phase 11 remains in the high austenite phase portion 18 on the surface of the steel 6. As a result, the bonding between the austenite phase 11 at the surface of the steel granules 6 and the Ni—P alloy part 7 remains in a dispersed state. Accordingly, the porous sintered layer 4 in the sliding member 1 of the present embodiment has a high strength.

Next, a manufacturing method of the sliding member 1 in FIGS. 4 and 5 will be described. First, a mixed powder of an atomized carbon steel powder with 0.3 to 1.3 mass % carbon and an atomized Ni—P alloy powder is prepared. In preparing the mixed powder, components of the Ni—P alloy part 7 is necessary to be in a powder form of the Ni—P alloy. When the Ni—P alloy part 7 includes optional elements such as B, Si, Cr, Fe, Sn or Cu, it is necessary to prepare the mixed powder of the atomized Ni—P alloy powder including the optional elements and the atomized carbon steel powder. The prepared mixed powder is spread on a back metal at a room temperature, and then sintered in a reducing atmosphere at a temperature between 930° C. and 1000° C. in a sintering furnace without pressurizing the spread powder layer.

The carbon steel with 0.3 to 1.3 mass % carbon, before sintering, has a structure of a ferrite phase 9 and perlite 10; or a structure of perlite 10; or a structure of perlite 10 and cementite. When a temperature reaches 727° C. (A1 transformation point) in a heating step during sintering, the structure starts transforming into an austenite phase 11, and completely transforms into a single austenite phase 11 at 900° C. Since an austenite phase 11 has a larger interstice (distance) between Fe atoms than that of a ferrite phase 9, Ni atoms in the Ni—P alloy part 7 easily enters the interstice and thus Ni easily diffuses therein. As described above, the composition of the Ni—P alloy is selected so as to completely melt at or above the temperature (A3 transformation point, Acm transformation) at which the structure of the steel 6 completely transforms into the austenite phase 11, and the sintering temperature is set at or above the temperature at which the Ni—P alloy particles completely melt. This is because the Ni atoms in the Ni—P alloy part 7 in a liquid phase more easily diffuses into the austenite phase 11 at the surface of the steel 6 than the Ni atoms is in a solid phase.

When a ratio of a ferrite phase 9 in the high austenite phase portion 18 is at least 25% higher than a ratio of a ferrite phase 9 in the central portion of the steel granules 6 as in FIGS. 4 and 5, the bonding strength between the steel 6 and the Ni—P alloy part 7 is further enhanced.

If the high austenite phase portion 18 has a high ratio of perlite 10 or the mixture 10A of perlite and cementite, shearing may be locally caused at an interface between the Ni—P alloy part 7 and the high austenite phase portion 18 of the steel granules 6 when the sliding member 1 is used as a bearing. Since the cementite as iron carbide (Fe3C) and the perlite 10 including the cementite (Fe3C) have a small thermal expansion coefficient than that of the Ni—P alloy part 7, a shearing stress generates due to the difference of the thermal expansion at the interface between the Ni—P alloy part 7 and the perlite 10 or the mixture 10A of perlite and cementite on the surface of the high austenite phase portion 18, which may form a fine shearing portion, when a temperature of the sliding layer 3 rises in use of the sliding member 1.

In contrast, the high austenite phase portion 18 at the surface of the steel granules 6 facing the Ni—P alloy part 7 in the present embodiment has a ratio of the ferrite phase 9 at least 25% higher than a ratio of a ferrite phase 9 in the central portion of the steel granules 6, so that the shearing between the steel 6 and the Ni—P alloy part 7 hardly occurs. The reason is that the ferrite phase 9 has a small difference in the thermal expansion coefficient in comparison with the Ni—P alloy part 7.

The ratio of the ferrite phase 9 in the high austenite phase portion 18 relates to a retention time from a complete melt of the Ni—P alloy in the sintering step until solidification of the Ni—P alloy in the cooling step. As the retention time is prolonged, a diffusion of Ni atoms in a vicinity of a surface of the steel granules 6 and a diffusion of the carbon atoms of the vicinity of the surface into an internal portion are accelerated, thereby the ratio of a ferrite phase 9 in the high austenite phase portion 18 tends to increase and the ratio of a ferrite phase 9 in the central portion of the steel granules 6 tends to decrease.

The sliding member 1 of the present invention is not limited to the constitution described above. The ratio of a ferrite phase 9 in the high austenite phase portion 18 may be equal to or larger than the ratio of a ferrite phase 9 in the central portion of the steel granules 6.

Embodiment 3

Next, an embodiment of a sliding layer having a high wear resistance as well as excellent corrosion resistance and high strength of a porous sintered layer is described with reference to FIGS. 6 to 9, while it is not limited thereto. Difference from Embodiment 2 is mainly described as follows, and the description in Embodiment 2 is applicable in basically the same manner to the matters not described in the following.

When multi-layered sliding materials described in JPA-2002-61653, JP-A-2001-355634 or JP-A-2013-83304 are used as a sliding member, a resin composition covering a surface of a porous sintered layer is sometimes worn away, and the porous sintered layer including a copper alloy is exposed to a sliding surface. In other case, a surface of the multi-layered sliding materials is machined in advance before use as the sliding member, such that the porous sintered layer is exposed to the sliding surfaces. In these conventional multi-layered sliding materials, however, a strength of the porous sintered layer including a copper alloy is insufficient, and has poor wear resistance.

In the present embodiment, a sliding member includes a back metal layer and a sliding layer. The sliding layer includes a porous sintered layer on a surface of the back metal layer, and a resin composition with which pores and a surface of the porous sintered layer are impregnated and covered. The porous sintered layer includes a plurality of steel granules stacked on a surface of the back metal layer, viewed in a cross-sectional and a Ni—P alloy part functioning as a binder that binds the steel granules with one another and/or binds the steel granules with the back metal layer. The steel granules are made of a carbon steel with 0.8 to 1.3 mass % carbon and have a structure of a ferrite phase, a mixture of perlite and cementite, and an austenite phase. At a surface of the steel granules facing the Ni—P alloy part, a high austenite phase portion is formed, having a ratio of an austenite phase at least 20% higher than a ratio of an austenite phase in the central portion of the steel granules. Among a plurality of the steel granules stacked in the cross-sectional view, the sliding surface-side steel granule group disposed on a sliding surface side of the porous sintered layer has an average area ratio of a ferrite phase in the granular steel of not more than 10%, while an interface-side steel granule group of the porous sintered layer facing the back metal layer has an average area ratio of a ferrite phase in the granular steel of not less than 20%.

The steel granules are made of a carbon steel with 0.8 to 1.3 mass % carbon, and have a structure of a ferrite phase, a mixture of perlite and cementite, and an austenite phase. If a carbon steel having a carbon content of less than 0.8 mass % is used, the porous sintered layer has a low strength and the wear resistance of the sliding member is insufficient. If a carbon steel having a carbon content of more than 1.3 mass % is used, an average area ratio of a ferrite phase in the interface-side steel granule group tends to be less than 20%.

Among a plurality of the steel granules stacked in the cross-sectional view, the steel granules in the sliding-side steel granule group disposed on a sliding surface side of the porous sintered layer have an average area ratio of a ferrite phase of not more than 10%, thereby a wear resistance of the porous sintered layer increases. Specifically, when a resin composition covering a surface of the porous sintered layer is worn away in use of the sliding member, the steel granules in the sliding surface-side steel granule group is exposed to a sliding surface. The steel granules in the sliding surface-side steel granule group is hard, since they have an average area ratio of a ferrite phase of not more than 10%. Thus, the wear resistance of the sliding layer increases. If the average area ratio of a ferrite phase in the steel granules in the sliding surface-side steel granule group is more than 10%, the effect for enhancing the wear resistance of the sliding layer decreases. On the other hand, steel granules in the interface-side steel granule group of the porous sintered layer facing the back metal layer, has an average area ratio of a ferrite phase of not less than 20%. Thus, a difference in the thermal expansion at an interface between the Ni—P alloy part and the steel in the interface-side steel granule group is small. Consequently, shearing hardly occurs at the interface, so that the strength of the porous sintered layer can be enhanced.

In the interface-side steel granule group, preferably the steel granules which have an area ratio of a ferrite phase at a surface of the steel granules being not less than 50% have a volume ratio of not less than 50% in relation to the entire steel granules. Preferably, the ratio of the Ni—P alloy part in the porous sintered layer is 5 to 30 parts by mass in relation to 100 parts by mass of the porous sintered layer.

Figure 7:
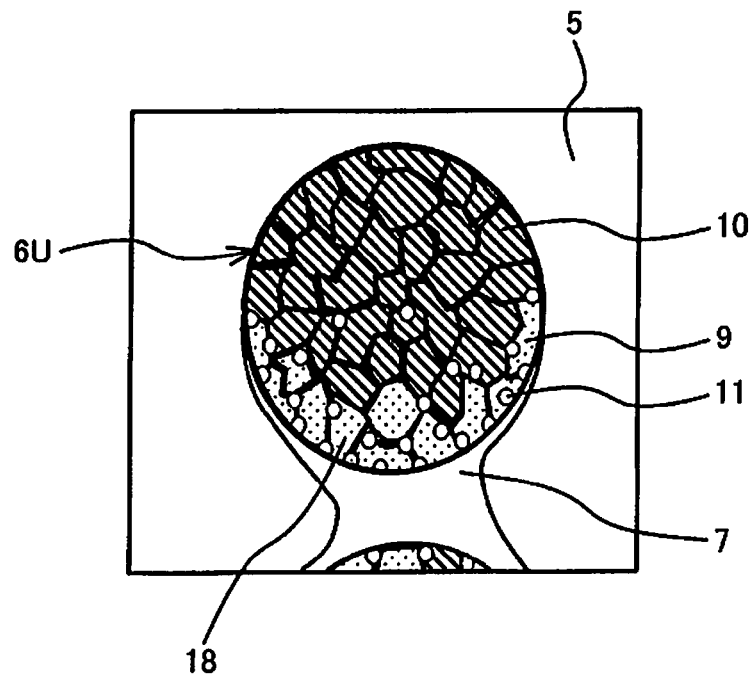
FIG. 7 is an enlarged view showing a structure of steel granules in a sliding-side steel granule group in FIG. 6.
Figure 8:
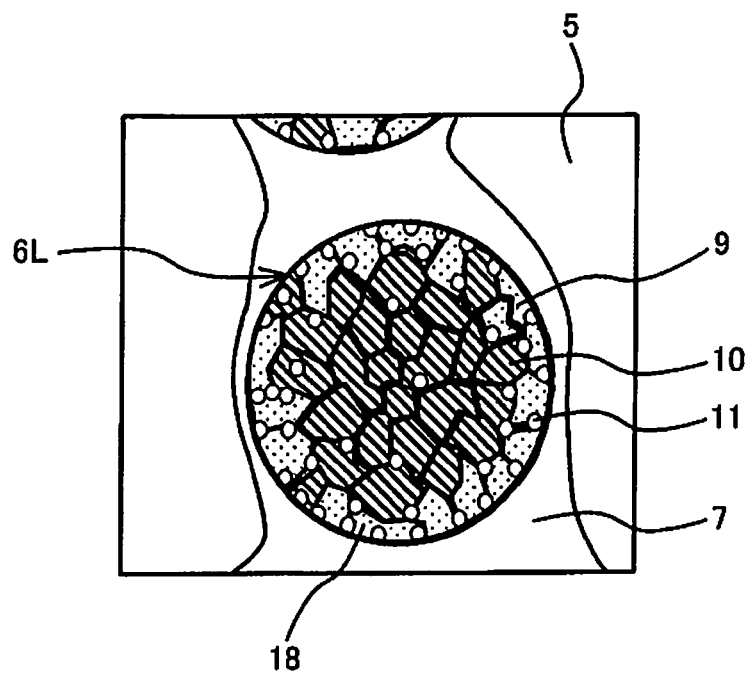
FIG. 8 is an enlarged view showing a structure of steel granules in an interface-side steel granule group in FIG. 6.

FIG. 7 is an enlarged view showing a structure of a granular steel 6U in the sliding surface-side steel granule group 6UG. FIG. 8 is the enlarged view showing a structure of steel granules 6L in the interface-side steel granule group 6LG. In FIGS. 7 and 8, an austenite phase 11 is illustrated in the steel granules 6 in an exaggerated manner for easy comprehension.

A plurality of the steel granules 6 are layered (2 pieces or layers in FIG. 6) on a surface of the back metal layer 2 in the cross-sectional view in a direction perpendicular to the sliding surface of the sliding member 1. A part of a surface of the steel granules 6 is not covered with the Ni—P alloy part 7, while entire surface of the steel granules 6 may be covered with the Ni—P alloy part 7. For the steel granules 6U disposed on the sliding surface side of the porous sintered layer 4, preferably the surfaces of the granules on the side of sliding surface is not covered with the Ni—P alloy part 7.

The steel granules 6 are made of a carbon steel with 0.8 to 1.3 mass % carbon, and commercially available granular hypereutectoid steel produced by an atomizing process may be used. The carbon steel provides higher corrosion resistance against organic acids or sulfur than a conventional copper alloy. The steel granules 6 including the above carbon content may further include: one or more of up to 1.3 mass % of Si, up to 1.3 mass % of Mn, up to 0.05 mass % of P and up to 0.05 mass % of S; and the balance of Fe and inevitable impurities. The steel 6 has a structure of: a ferrite phase 9, a mixture 10 of perlite and cementite, and an austenite phase 11, while the structure may include fine precipitates (precipitates that can not be detected by observation at 1000-fold magnification using a scanning electron microscope). The steel granules 6 may have a reaction phase produced by reaction with the component of the Ni—P alloy part 7 at a surface (facing the Ni—P alloy part 7). Since the porous sintered layer 4 includes the granular steel 6 and the Ni—P alloy part 7, it has high corrosion resistance against organic acids or sulfur.

As shown in FIGS. 7 and 8, the steel granules 6 have a structure of a ferrite phase 9, a mixture 10 of perlite and cementite, and an austenite phase 11. At the surface of the steel 6 facing the Ni—P alloy part 7, a high austenite phase portion 18 is formed, which has an austenite phase 11 with a ratio at least 20% higher than a ratio of the austenite phase 11 in the central portion of the steel granules 6. The high austenite phase portion 18 forms an approximately half annular layer adjacent to a surface of the steel granules 6 facing the Ni—P alloy part 7 in the cross-sectional structure of the steel granules 6 as shown in FIG. 7, and an approximately annular layer adjacent to a surface facing the Ni—P alloy part 7 in the cross-sectional structure of the steel granules 6 as shown in FIG. 8. It is permitted that not more than 20% of the number of the steel granules 6 constituting the porous sintered layer 4 (or not more than 20 volume % of the total volume of the steel granules 6) are not provided with an austenite phase 11 in the structure. The structure of the steel 6 may include a bainite phase, a sorbite phase, a troostite phase, a martensite phase, etc., in a small amount (a ratio in the structure of not more than 3%). As shown in FIG. 7, the high austenite phase portion 18 is not formed at a part of a surface of the steel granules 6 not covered with the Ni—P alloy part 7 (the part in contact with the resin composition 5). Different from the embodiment, the high austenite phase portion 18 may be formed at a part of the surface not covered with the Ni—P alloy part 7.

The steel granules 6 of the sliding member 1 of the present invention have a different structure from a typical carbon steel. A typical hypereutectoid steel has a structure of perlite and cementite (structure of a mixture 10 of perlite and cementite) at a low temperature, and transforms into a single austenite phase 11 when heated at a temperature above a Acm transformation point (that varies depending on a carbon content, e.g. about 900° C. in a case of a hypereutectoid steel with 1.2 mass % carbon). When the single austenite phase 11 is cooled lower than the Acm transformation point, a part of the austenite phase 11 starts to transform into cementite (Acm transformation), thereby a structure of an austenite phase 11 and cementite is obtained until a temperature reaches A1 transformation point (727° C.). When a temperature reaches the A1 transformation point (727° C.), the retained austenite phase 11 transforms into perlite (eutectoid transformation). Consequently, a typical hypereutectoid steel has a structure of perlite and cementite (structure of a mixture 10 of perlite and cementite), and a typical eutectoid steel (carbon steel with a carbon content of 0.8 mass %) has a single perlite structure.

Presence or absence of the high austenite phase portion 18 at a surface of steel granules 6, an average thickness of the high austenite phase portion 18, and an area ratio and an average grain size of an austenite phase 11 in the high austenite phase portion 18 can be determined in the same manner as in Embodiment 2.

When the steel granules 6 are partially covered with the Ni—P alloy part 7 as shown in FIG. 7, only the part of the surface covered with the Ni—P alloy part 7 may be measured for the measurement of the average thickness of the high austenite phase portion 18, the area ratio of the austenite phase 11 in the high austenite phase portion 18, and the average grain size of the austenite phase 11.

The steel granules 6 have a structure of a ferrite phase 9, a mixture 10 of perlite and cementite, and an austenite phase 11. Among a plurality of the steel granules 6 stacked on the back metal layer 2 in a cross-sectional view of the sliding member 1, the steel granules 6U in the sliding surface-side steel granule group 6UG which is disposed on the porous sintered layer 4 has an average area ratio of an ferrite phase 9 of not more than 10%. On the other hand, the steel granules 6L in the interface-side steel granule group 6LG disposed on the interface side of the porous sintered layer 4 facing the back metal layer 2 has an average area ratio of an ferrite phase 9 of not less than 20%. In a cross-sectional view in a direction perpendicular to the sliding surface of the sliding member 1, a surface F of the porous sintered layer 4 is defined as follows. A reference point P is determined on a top point of a surface (namely the top point of the surface closest to a sliding surface) of a steel granule which is located uppermost among a plurality of steel granules 6 disposed on the surface side of the porous sintered layer 4 (namely, the surface of the porous sintered layer 4 on the sliding surface side of the sliding member 1, or the upper side in FIG. 6). An imaginary line (broken line in FIG. 6) passing through the reference point P, in parallel to the sliding surface is defined as the surface F of the porous sintered layer 4.

The sliding surface-side steel granule group 6UG is defined as a group of the steel granules 6U, as follows. A depth D1 is defined to be a half of an average grain size of the steel granules 6, from the surface F of the porous sintered layer toward the interface side of the back metal layer 2. Among granular steel 6 in the porous sintered layer 4, steel granules 6U are determined such that at least a part of a cross-section of the steel granules 6U is included within the depth D1 from the surface F.

Among steel granules 6 in the porous sintered layer 4, the interface-side steel granule group 6LG is defined as a group of steel granules 6L disposed closer to the interface side of the back metal layer 2 than the steel granules 6U of the sliding surface-side steel granule group 6UG, except for the steel granules 6U in the sliding surface-side steel granule group 6UG.

A diffusion of Ni of the Ni—P alloy part 7 into a surface of the steel granules 6 occurs in the same manner as described in Embodiment 2. The diffusion of Ni relates to formation of the high austenite phase portion 18 and formation of a ferrite phase 9 in the steel granules 6.

See the description in Embodiment 1 and 2 regarding the Ni—P alloy part 7. Even if the Ni—P alloy part 7 includes optional elements, they do not have any influence on the formation of the high austenite phase portion 18 and the formation of the ferrite phase 9 in the steel 6.

In the Embodiment, a ratio of the Ni—P alloy part 7 in the porous sintered layer 4 is 5 to 30 parts by mass, more preferably 10 to 20 parts by mass, in relation to 100 parts by mass of the porous sintered layer 4. If the ratio is more than 30 parts by mass, parts to become pores in sintering is filled with a liquid of the Ni—P alloy. Consequently, the porous sintered layer 4 has an excessively decreased porosity, and also the steel granules 6U in the sliding surface-side steel granule group 6UG has an excessively increased ratio of a ferrite phase 9.

Pores and a surface of the porous sintered layer 4 are impregnated and covered with the resin composition 5. As shown in FIGS. 7 and 8, the resin composition 5 is in contact with a surface of the steel granules 6 of the porous sintered layer 4 or a surface of the Ni—P alloy part 7. The description as in the Embodiment 1 can be applied to the resin composition 5.

As shown in FIG. 7, the steel granules 6U in the sliding surface-side steel granule group 6UG has a structure of a ferrite phase 9, a mixture 10 of perlite and cementite, and an austenite phase 11, and has an average area ratio of the ferrite phase 9 of not more than 10%. A surface of the granules 6U on the sliding surface side is not covered with the Ni—P alloy part 7, where an amount of ferrite phase 9 is particularly decreased. On the other hand, a surface of the granules 6Un on the side of the back metal layer 2 is in contact with the Ni—P alloy part 7 as a binder, where an amount of a ferrite phase 9 increases.

As shown in FIG. 8, the granules 6L of the interface-side steel granule group 6LG has a structure of a ferrite phase 9, a mixture 10 of perlite and cementite, and an austenite phase 11, and has an average area ratio of a ferrite phase 9 of not less than 20%. The ferrite phase 9 in the steel granules 6L includes carbon in a small amount up to 0.02 mass %, and has a composition close to a pure iron. On the other hand, in the mixture 10 of perlite and cementite in the steel 6L, perlite which has a lamellar structure of a ferrite phase and cementite arranged alternately in a thin sheet, and cementite ($Fe_3C$) as iron carbide are coexisted. The mixture 10 of perlite and cementite includes carbon in a larger amount than a ferrite phase 9, and is harder than the ferrite phase 9. In a vicinity of a surface of the granules 6L facing the resin composition 5 or the Ni—P alloy part 7, a larger amount of ferrite phase 9 is formed than in the central portion of the granules 6L. Note that the "ferrite phase 9" referred to herein does not includes a ferrite phase in the perlite.

The structures of the steel granules 6U in the sliding surface-side steel granule group 6UG shown in FIG. 7, and of the steel granules 6L in the interface-side steel granule group 6LG shown in FIG. 8 are mere examples and not limited to the structures shown in FIGS. 7 and 8. The steel granules 6U and the steel granules 6L may be formed such that the entire surface is covered with the Ni—P alloy part 7 or that a ferrite phase 9 is uniformly distributed in the structure.

In the embodiment, a scanning electron microscope is used to take electron images of a plurality of spots (e.g. 3 spots) in a cross-section in a direction parallel to a thickness direction of the sliding member 1 at 500-fold magnification. With use of a typical image analysis method (e.g. analysis software: Image-Pro Plus (Version 4.5) by Planetron, Inc.), the images are first classified into the granules 6U in the sliding surface-side steel granule group 6UG and the granules 6L in the interface-side steel granule group 6LG, as described above. Then, an average area ratio of a ferrite phase 9 in the granules 6U in the sliding surface-side steel granule group 6UG as well as in the interface-side steel granule group 6LG are measured.

When not less than 50% in volume of the steel granules 6L in the interface-side steel granule group 6LG has an area ratio of a ferrite phase 9 at a surface of the granules of not less than 50% as shown in FIG. 8, a bonding strength of the sliding layer 3 with the Ni—P alloy part 7 can be further enhanced.

Although the area ratio of a ferrite phase 9 at a surface of the steel granules 6L can not be directly measured, it can be confirmed as follows. Using a scanning electron microscope, electron images of a plurality of spots (e.g. 3 spots) in a cross-section in a direction parallel to a thickness direction of the sliding member 1 are taken at 500-fold magnification. Using a typical image analysis method (e.g. analysis software: Image-Pro Plus (Version 4.5) by Planetron, Inc.), a length ratio of the profile line of the ferrite phase 9 to the entire length of the profile line of each steel 6L (length ratio of a portion corresponding to the ferrite phase 9, in the profile line as an outer periphery of the steel 6L) in the images is measured for the confirmation. Then, total area (A1) of the entire steel 6L in the interface-side steel granule group 6LG in the images, and total area (A2) of the steel 6L with an area ratio of the ferrite phase 9 at the surface of the granule of not less than 50% are measured to calculate the ratio A2/A1. The volume ratio (volume fraction) of the steel 6L with an area ratio of the ferrite phase 9 at the surface of the granule of not less than 50% in relation to the total volume of the steel 6L in the interface-side steel granule group 6LG can be thereby confirmed.

In the sliding member 1 of the present embodiment, the steel granules 6 are made of a carbon steel with 0.8 to 1 mass % carbon, and has a structure of a ferrite phase 9, a mixture 10 of perlite and cementite, and an austenite phase 11. The Ni—P alloy part 7 functions as a binder that binds the steel granules 6 with one another and/or binds the steel granules 6 with the back metal layer 2. At a surface of the steel granules 6 facing the Ni—P alloy part 7, a high austenite phase portion 18 is formed, which has a ratio of an austenite phase 11 at least 20% higher than a ratio of the austenite 11 in the central portion of the granules 6. Consequently, a strength of the porous sintered layer 4 is enhanced. Specifically, the surface of the steel granules 6 having a structure of an austenite phase 11 is bonded to a Ni—P alloy part 7 in the sintering step. The Ni—P alloy part 7 does not cause a phase transformation (structure change) by cooling after sintering, since the austenite phase 11 remains as the high austenite phase portion 18 at the surface of the granules 6. As a result, the bonding state between the austenite phase 11 at the surface of the granules 6 and the Ni—P alloy part 7 remains in a dispersed state. Accordingly, the strength of the porous sintered layer 4 in the sliding member 1 of the present embodiment is enhanced.

Furthermore, in the present embodiment, although a carbon steel (hypereutectoid steel) powder with a structure of perlite and cementite is used for the steel 6 in the porous sintered layer 4, the structure of the steel 6 after sintering is of a ferrite phase 9, a mixture 10 of perlite and cementite, and an austenite phase 11. A plurality of the steel granules 6 are stacked on the surface of the back metal layer 2 with the Ni—P alloy part 7 as binder. In the interface-side steel granule group 6LG, an average area ratio of a ferrite phase 9 in the steel granules 6L is not less than 20%. Consequently, even when a temperature of the sliding member 1 rises in use, only a small difference in the thermal expansion between the Ni—P alloy part 7 and the steel granules 6L in the interface-side steel granule group 6LG generates, so that the shearing hardly occurs at the interface. The bonding between the Ni—P alloy part 7 and the steel granules 6L in the interface-side steel granule group 6LG is thereby enhanced, resulting in the enhanced strength of the porous sintered layer 4.

Since perlite includes a cementite iron carbide ($Fe_3C$), it has a small thermal expansion coefficient. On the other hand, a ferrite phase 9 has a larger thermal expansion coefficient in comparison with cementite or perlite, and thus has only a small difference in the thermal expansion coefficient from that of the Ni—P alloy part 7. Consequently, a ferrite phase 9 on the surface of the steel granules 6L exposed to the Ni—P alloy part 7 has enhanced bonding due to the reduced shearing force caused by the difference in the thermal expansion at the interface between the steel granules 6L and the Ni—P alloy part 7, resulting in the enhanced strength of the porous sintered layer 4.

On the other hand, the steel 6U in the sliding surface-side steel granule group 6UG has an average area ratio of a ferrite phase 9 of not more than 10%. When the resin composition 5 covering the surface of the porous sintered layer 4 is worn away during use of the sliding member 1, the steel granules 6U in the sliding surface-side steel granule group 6UG is exposed. The steel granules 6U have sufficient hardness, since the average area ratio of a ferrite phase 9 is not more than 10%. Thus, a wear resistance of the sliding layer 3 in the sliding member 1 increases. Although the steel granules 6L in the interface-side steel granule group 6LG has an average area ratio of a ferrite phase 9 of not less than 20%, and has a lower hardness than the steel granules 6U in the sliding surface-side steel granule group 6UG. The steel granules 6L, however, is not exposed to the sliding surface, and has no influence on the wear resistance of the sliding layer 3.

A method for producing the sliding member 1 according to the present embodiment is described as follows. A mixed powder is prepared in the same manner as in Embodiment 2, except that an atomized carbon steel powder including 0.8 to 1.3 mass % carbon is used.

A ratio of the Ni—P alloy powder in the mixed powder is preferably 5 to 30 parts by mass in relation to 100 parts by mass of the mixed powder.

Figure 9:
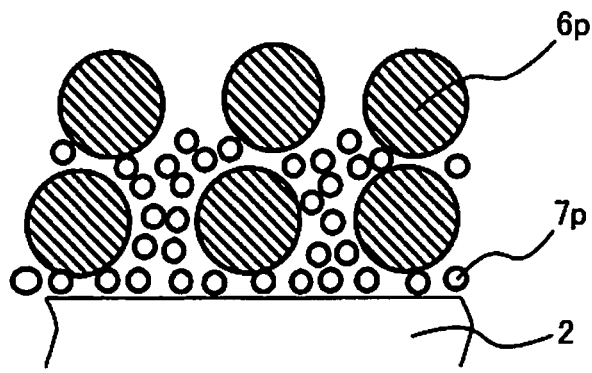
FIG. 9 is a schematic view showing a cross-section of a state where powder is spread on a surface of a back metal layer.

The prepared mixed powder is spread on a back metal at a room temperature to form a spread powder layer. FIG. 9 shows a state of the spread powder layer before sintering. As shown in FIG. 9, a plurality of (two pieces in FIG. 9) carbon steel particles 6p (steel 6) are stacked in the spread powder layer on the surface of the back metal layer 2. When the Ni—P alloy powder 7p has an average grain size of 10 to 30% in relation to an average grain size of the carbon steel powder 6p (steel 6), a large amount of Ni—P alloy powder 7p positions in an interstice between particles of the carbon steel powder 6p or in an interstice between the carbon steel powder 6p and the surface of the back metal layer 2, and thus an amount of the Ni—P alloy powder 7p in a vicinity of the surface of the spread powder layer, which forms a surface of the porous sintered layer 4, is reduced in comparison with the amount in the internal of the spread powder layer. This is because an average grain sizes of the carbon steel powder 6p and the Ni—P alloy powder 7p are selected such that the Ni—P alloy powder 7p spread on the surface of the spread powder layer is easily flows through an interstice between the particles of the carbon steel powders 6p toward the interface with the surface of the back metal layer 2, due to gravity or vibration during the spreading, when the mixed powder is spread on the surface of the back metal layer 2.

Subsequently, the spread powder layer is sintered in a reducing atmosphere at 930° C. to 1000° C. in a sintering furnace without application of pressure. When a temperature reaches 880° C. in the heating step during the sintering, the Ni—P alloy particles having a composition of 9 to 13 mass % of P and the balance of Ni starts to melt. The liquid phase flows between the particles of the carbon steel (steel 6) and between the particles of carbon steel (steel 6) and the surface of the back metal layer 2, and start to form the porous sintered layer 4 on the surface of the back metal layer 2. Since the Ni—P alloy has a composition of 9 to 13 mass % of P and the balance of Ni, it completely transforms into a liquid phase at 950° C. When the amount of P is reduced and the Ni—P alloy has a composition of 10 to 12 mass % of P and the balance of Ni, it completely transforms into a liquid phase at 930° C.

Regarding the sintering temperature, see Embodiment 2.

Regarding the sintering step, please refer to Embodiment 2. Note that the carbon steel with 0.8 to 1.3 mass % carbon has a structure of a mixture 10 of perlite and cementite, before sintering.

Consequently, the steel granules 6 have a structure of a ferrite phase 9, a mixture 10 of perlite and cementite, and an austenite 11 after sintering. Furthermore, a high austenite phase portion 18 is formed at a surface of the steel granules 6 facing the Ni—P alloy part 7. The high austenite phase portion 18 has an austenite phase 11 with a ratio at least 20% higher than a ratio of the austenite phase 11 in the internal part of the steel granules 6. The structure of the steel granules 6 may include a bainite phase, a sorbite phase, a troostite phase, a martensite phase, etc., in a small amount (a ratio in the structure of not more than 3%).

Furthermore, since a ratio of the Ni—P alloy powder 7*p* is reduced before sintering on a surface side of the spread powder layer as shown in FIG. 9, a diffusion of Ni atoms of the Ni—P alloy into the carbon steel powder 6*p* (steel granules 6) stacked on the surface side of the spread powder layer hardly occurs during sintering. However, the diffusion into the carbon steel powder 6*p* (granular steel 6L) stacked on an interface side of the spread powder layer facing the back metal layer 3 easily occurs. Consequently, among a plurality of stacked steel granules 6 in the cross-sectional view of the porous sintered layer 4 after sintering, the steel granules 6U in the sliding surface-side steel granule group 6UG disposed on the sliding surface side of the porous sintered layer 4 has a reduced average area ratio of a ferrite phase 9 of not more than 10%, while the steel granules 6L in the interface-side steel granule group 6LG disposed on the interface side of the porous sintered layer 4 facing the back metal layer 2 has an increased average area ratio of a ferrite phase 9 of not less than 20%.

Less Ni atoms diffuse in the steel granules 6U in the sliding surface-side steel granule group 6UG than in the steel granules 6L in the interface-side steel granule group 6LG. In particular, the Ni atoms do not diffuse, or a slight amount of Ni atoms diffuses, into a surface on a sliding surface side of the steel granules 6U. Furthermore, the surface of the porous sintered layer 4 on the sliding surface side can be formed of the surface of the steel granules 6U since the surfaces of the steel granules 6U disposed on the sliding surface side of the porous sintered layer 4 is not covered with the Ni—P alloy part 7.

The steel granules 6L in the interface-side steel granule group 6LG, which have an area ratio of a ferrite phase 9 of not less than 50% at the surface of the granules, may occupy a volume ratio of be not less than 50% in relation to the entire steel granules 6L in the interface-side steel granule group 6LG. In the case, an average area ratio of a ferrite phase 9 in the steel granules 6L can be increased after sintering by the following methods:

a carbon steel with a low carbon in the range of the present invention (e.g. 0.8 to 1.1 mass % carbon) may be used as the carbon steel powder in preparation of the mixed powder described above;

a ratio of the Ni—P alloy part 7 in the porous sintered layer 4 is increased to 25 to 40 parts by mass; or an amount of the Ni atoms to diffused into the surface of the steel granules 6L is increased through control of a sintering temperature, a heating time, etc.

The member including the porous sintered layer 4 on a surface of the back metal layer 2 produced as described above is impregnated with a resin composition 5 (which may be diluted with an organic solvent) such that it fills pores and cover a surface of the porous sintered layer 4. The member is heated for drying and baking the resin composition 5, so that a sliding layer 3 including the porous sintered layer 4 and the resin composition 5 is formed on the surface of the back metal layer 2. Any resin compositions described above may be used as resin composition 5. A sliding surface of the sliding member 1 of the present invention is subjected to cutting or grinding in advance for use, so that the steel granules 6U in the sliding surface-side steel granule group 6UG of the porous sintered layer 4 can be exposed on the sliding surface.

The Ni—P alloy phase 7 of the porous sintered layer 4 in the present embodiment may include an optional element such as B, Si, Cr, Fe, Sn and Cu. In the case, a mixed powder of an atomized Ni—P alloy powder including the optional element and an atomized carbon steel powder is prepared and sintered on a back metal. Different from the embodiment, if a mixed powder including a single optional element such as B, Si, Cr, Fe, Sn and Cu in an elemental powder form, or an alloy of the optional elements in a powder form, the binder part is composed of a Ni—P alloy part, a phase including the optional element, and a reaction phase formed between the Ni—P alloy and the phase of the optional element, resulting in a reduced strength of the porous sintered layer. In particular, it should be avoided to add a pure Sn powder or a Sn-base alloy in the mixed powder. The pure Sn and the Sn-base alloy have a low melting point, and liquefy at about 232° C. at a very initial stage of the heating step during the sintering. The liquefied Sn atoms react with Fe atoms at the surface of the steel, and thus an $Fe_2Sn$ phase or an $Fe_3Sn$ phase (intermetallic compound) is produced so that the phase lies in an interface between the Ni—P alloy part and the steel granules and no ferrite phase is formed. The $Fe_2Sn$ phase and the $Fe_3Sn$ phase are hard but brittle, and thus a bonding strength between the Ni—P alloy part and the steel extremely reduces.

The invention claimed is:

1. A sliding member comprising:
a steel back metal layer; and
a sliding layer on the steel back metal layer, the sliding layer including a porous sintered layer and a resin composition,
wherein the porous sintered layer includes a Ni—P alloy part and Fe or Fe alloy granules,
wherein the Ni—P alloy part functions as a binder for binding the Fe or Fe alloy granules with one another and/or for binding the Fe or Fe alloy granules with the steel back metal layer, and wherein the steel back metal layer is made of a carbon steel including 0.05 to 0.3 mass % of carbon, and comprises:
  a non-austenite-containing portion in a central portion of a thickness direction of the steel back metal layer, the non-austenite-containing portion having a structure of a ferrite phase and perlite formed; and
  an austenite-containing portion in a surface portion of the steel back metal layer facing the sliding layer, the austenite-containing portion having a structure of a ferrite phase, perlite and an austenite phase.

2. The sliding member according to claim 1, wherein Ni atoms of the Ni—P alloy part is diffused into the austenite-containing portion.

3. The sliding member according to claim 1, wherein the austenite-containing portion has an average thickness of 1 to 30 μm.

4. The sliding member according to claim 1, wherein a ratio of the austenite phase in the austenite-containing portion is 0.05 to 3 volume %.

5. The sliding member according to claim 1, wherein the austenite phase in the austenite-containing portion has an average grain size of 0.5 to 5 μm.

6. The sliding member according to claim 1, wherein a ratio of the perlite in the austenite-containing portion is at least 25% less than a ratio of the perlite in the non-austenite-containing part.

7. The sliding member according to claim 1, wherein the Ni—P alloy part has a composition comprising:
  9 to 13 mass % of P;
  optionally one or more selected from 1 to 4 mass % of B, 1 to 12 mass % of Si, 1 to 12 mass % of Cr, 1 to 3 mass % of Fe, 0.5 to 5 mass % of Sn and 0.5 to 5 mass % of Cu; and
  the balance of Ni and inevitable impurities.

8. The sliding member according to claim 1, wherein a ratio of the Ni—P alloy part in the porous sintered layer is 5 to 40 parts by mass in relation to 100 parts by mass of the porous sintered layer.

9. The sliding member according to claim 1, wherein the Fe or Fe alloy granules are made of a carbon steel including 0.3 to 1.3 mass % of carbon,
  wherein the Fe or Fe alloy granules have
    a structure of a ferrite phase, perlite and an austenite phase; or
    a structure of a ferrite phase, a mixture of perlite and cementite, and an austenite phase, and
  wherein the Fe or Fe alloy granules have a high austenite phase portion in a surface portion of the Fe or Fe alloy granules, the high austenite phase portion has a ratio of an austenite phase at least 20% higher than a ratio of an austenite phase in a central portion of the Fe or Fe alloy granules.

10. The sliding member according to claim 9, wherein the Fe or Fe alloy granules have an average grain size of 45 to 180 μm.

11. The sliding member according to claim 9, wherein Ni atoms of the Ni—P alloy part is diffused in a surface of the Fe or Fe alloy granules.

12. The sliding member according to claim 9, wherein the high austenite phase portion has a thickness of 1 to 30 μm.

13. The sliding member according to claim 9, wherein a ratio of the austenite phase in the high austenite phase portion is 0.05 to 3 volume %.

14. The sliding member according to claim 9, wherein the austenite phase in the high austenite phase portion has an average grain size of 0.5 to 5 μm.

15. The sliding member according to claim 9, wherein a ratio of the ferrite phase in the high austenite phase portion is at least 25% higher than a ratio of the ferrite phase in the central portion of the Fe or Fe alloy granules.

* * * * *